US005852475A

United States Patent [19]
Gupta et al.

[11] Patent Number: 5,852,475
[45] Date of Patent: Dec. 22, 1998

[54] TRANSFORM ARTIFACT REDUCTION PROCESS

[75] Inventors: Smita Gupta, Sunnyvale; Yi Tong Tse, San Jose, both of Calif.

[73] Assignee: Compression Labs, Inc., San Jose, Calif.

[21] Appl. No.: 486,279

[22] Filed: Jun. 6, 1995

[51] Int. Cl.[6] .................................................. H04N 5/21
[52] U.S. Cl. ........................ 348/606; 348/607; 382/199
[58] Field of Search .................... 348/606, 625, 348/607, 420, 384, 390, 699, 700; 382/268, 269, 199; 364/572, 724.01; 358/464; H04N 7/13, 7/133, 7/137

[56] References Cited

U.S. PATENT DOCUMENTS

| 4,503,461 | 3/1985 | Nishimura | 358/463 |
|---|---|---|---|
| 5,010,401 | 4/1991 | Murakami et al. | 348/417 |
| 5,093,871 | 3/1992 | Klein et al. | 382/51 |
| 5,359,676 | 10/1994 | Fan | 382/56 |
| 5,367,629 | 11/1994 | Chu et al. | 348/400 |
| 5,473,384 | 12/1995 | Jayant et al. | 348/470 |
| 5,481,628 | 1/1996 | Ghaderi | 382/261 |
| 5,512,956 | 4/1996 | Yan | 348/606 |
| 5,548,667 | 8/1996 | Tu | 382/285 |
| 5,552,832 | 9/1996 | Astle | 348/420 |
| 5,604,822 | 2/1997 | Pearson et al. | 382/199 |

FOREIGN PATENT DOCUMENTS 0 659 019  6/1995  European Pat. Off. .......... H04N 7/24

OTHER PUBLICATIONS

Liu et al: "Adaptive Post–Processing Algorithms for Low Bit Rate Video Signal", 19 Apr. 1994, ICASSP–94, IEEE, New York XP000533748.

Okada, et al.: "An Adaptive Image Quality Improvement Method for DCT Coding Schemes" 17 Mar. 1993, PCS'93 1993 Picture Coding Symposium Proceedings, Swiss Federal Institute of Technology, Lausanne (CH) XP000346472.

*Primary Examiner*—Chris Grant
*Attorney, Agent, or Firm*—Skjerven, Morrill, MacPherson, Franklin & Friel LLP

[57] ABSTRACT

A post-processor for a decoded video sequence includes a digital noise reduction unit and an artifact reduction unit which significantly reduce blocking artifacts and mosquito noise in a video image. The post-processor uses both temporal and edge characteristics of the video image to enhance the displayed image. The post-processor operates on a current frame of pixel data using information from the immediately preceding post-processed frame that is stored in a frame memory of the post-processor. The post-processor first identifies texture and fine detail areas in the image. The post-processor uses artifact reduction only on portions of the image that are not part of an edge, and are not part of a texture or fine detail area. Since artifact reduction is not utilized on these areas, the post-processed image is not softened in regions where it is easily noticed by the human eye.

111 Claims, 10 Drawing Sheets

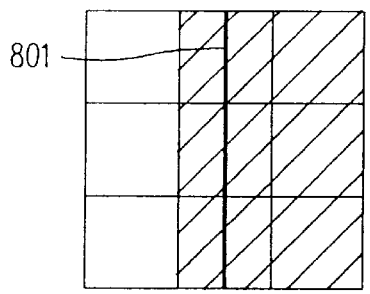
FIG. 7
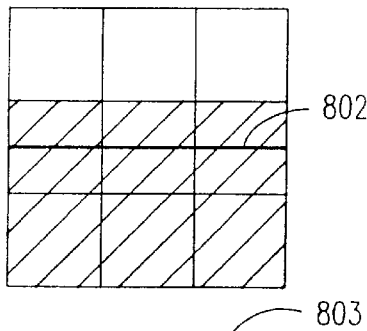
FIG. 8A
FIG. 8B
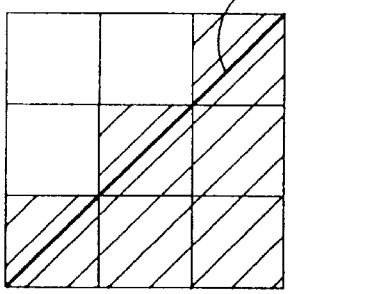
FIG. 8C
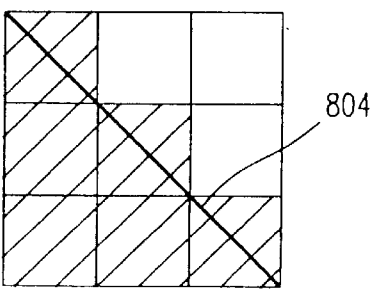
FIG. 8D

5,852,475

TRANSFORM ARTIFACT REDUCTION PROCESS

FIELD OF THE INVENTION

This invention relates generally to post processing of a decoded digital image and in particular to post-processing that significantly reduces blocking artifacts and mosquito noise without comprising the overall quality of the image.

DESCRIPTION OF RELATED ART

Low bit rate video encoding introduces visually objectionable quantization artifacts in reconstructed images. The quality of reconstructed images can be improved by post-processing of the decoded data. In a video communication system 100 without post-processing, a video image signal 101 drives a video encoder 102. Video encoder 102 typically encodes a frame in video signal by processing blocks of pixels within the frame. Video encoder 102 typically divides each frame into non-overlapping blocks of data and then transforms these blocks of data. In most applications, a discrete cosine transform is used. The transformed data is quantized, and the quantized data is driven onto a communications channel 103.

Decoder 104 receives the quantized data from communication channel 103 and performs operations that are the inverse of those performed by encoder 102 to reconstruct a video image that represents original video image signal 101 for display on display unit 106. In particular, an inverse discrete cosine transform is used if encoder 102 employed a discrete cosine transform.

Discrete cosine transformation based compression, especially at low and moderate bit rates, results in two distinct type of artifacts in the reconstructed video image. A first type of artifacts is referred to as mosquito noise that is ringing around sharp edges in the video image that results from attenuation of high frequency transform coefficients. These artifacts show up as high frequency noise patterns around the edges of the decoded images.

A second type of artifacts is referred to as blocking. Blocking is visible tiling in a smooth area of the reconstructed video image since smooth transitions are replaced by abrupt changes introduced by the quantization. The size of tiles is the same as the block size used in the transform coding, typically eight-by-eight pixels.

Since both of the above artifacts are high frequency in nature, an intuitive way to reduce the artifacts is by low pass filtering the decoded image in a post-processor 205 (FIG. 2) prior to providing the reconstructed video signal to display unit 106. Such an approach often referred to as "spatially invariant filtering" has the undesirable side-effect of blurring details such as sharp edges. Blurring severely degrades the overall perceived quality of the image.

Clearly, a more sophisticated approach is needed to clean up the artifacts while preserving the sharpness in the decoded image. Spatially-variant filtering has been previously utilized in post-processing to address the shortcomings of spatially-invariant filtering. However, such filtering processes require sophisticated processors and have significant memory requirements. The complexity of this approach severely limits the applications for which spatially-variant filtering is practical. In particular, these solutions are not well-suited for either real-time applications or moderately priced systems.

Nevertheless, post-processing is desirable. Since post-processing is performed on the decoded image, no modifications are made to the encoded bit-stream transmitted over communication channel 103. Therefore a video receiver with post-processor 205 can provide better performance than decoder 104 without a postprocessor (shown in FIG. 1) while remaining compatible with existing encoders. Post-processing can be applied to any system including those which are standard compliant to gain a competitive advantage over other nominally standard compliant systems. However, a post-processing method is needed that requires neither excessive processing performance nor memory storage, but provides an enhanced picture quality without blurring of edges and edge boundary regions.

SUMMARY OF THE INVENTION

According to the principles of this invention, a post-processor for a decoded video sequence includes a digital noise reduction unit and an artifact reduction unit which significantly reduce blocking artifacts and mosquito noise in a video image. Preferably, the post-processor uses both temporal and edge characteristics of the video image to enhance the displayed image. However, post-processing based only upon edge characteristics, according to the principles of this invention, represents a significant improvement over the prior art post-processors that utilized spatially invariant filtering.

The post-processor of this invention operates on a current frame of pixel data using information from the immediately preceding post-processed frame that is stored in a frame memory of the post-processor. Since the human eye can easily discern textures and fine details in stationary areas within an image sequence, the post-processor preserves textures and low-level details in these stationary areas. Only stationary areas are of concern, because motion masking is such that texture loss is not noticed in the moving areas.

Specifically, the post-processor first identifies texture and fine detail areas in the decoded image, hereinafter, image. The post-processor uses artifact reduction only on portions of the image that are not part of an edge, and are not part of a texture or fine detail area. Since artifact reduction is not utilized on these areas by the post-processor, the post-processed image is not softened in regions where it is easily noticed by the human eye.

The digital noise reduction unit in the postprocessor attenuates small differences between each arriving pixel and the corresponding pixel from the preceding frame in the frame memory. Preferably, the digital noise reduction is recursive.

The artifact reduction unit first identifies a pixel as one of an edge pixel and a non-edge pixel and then sets an edge flag in an edge map for the pixel if the pixel was identified as an edge pixel. Using the edge map information for a current pixel and the pixels in a window surrounding the current pixel, the artifact reduction unit classifies the current pixel as one of an edge pixel, an edge border pixel, and a shade pixel. Edge pixels are not filtered by the artifact reduction unit. Edge border pixels are filtered with a one-dimensional filter, and shade pixels are filtered with a two dimensional filter.

Performing this spatially-variant filtering using only information in an edge map for a window about the current pixel provides a significant reduction in blocking artifacts, as described more completely below. The combination of digital noise reduction and the spatially-variant filtering of the artifact reduction unit provides an even better reduction in blocking artifacts and mosquito noise.

Thus, according to the principles of this invention, a transform artifact reduction method for decoded video pixel data includes performing digital noise reduction on a block of pixels to obtain a digitally noise reduced block of pixels, and filtering the digitally noise reduced block of pixels using a spatially-variant filter. Filtering the digitally noise reduced block of pixels is done by first generating an edge map for the block of pixels where in the edge map, an edge flag for each pixel in the block is configured to identify each pixel as one of an edge pixel and a non-edge pixel. Next, a pixel is assigned one classification in a plurality of edge classifications using edge flags in the edge map for pixels in a window about the pixel. The pixel is then filtered based upon the assigned classification to reduce transform artifacts in the video image.

To generate the edge map, a pixel gradient for the pixel is compared with a threshold. The edge flag for the pixel in the edge map is set upon the pixel gradient being greater than the threshold. In one embodiment, the pixel gradient is compared with an adaptive edge threshold. In another embodiment, the pixel gradient is compared with a luminance threshold. In yet another embodiment, the pixel gradient is compared with both an adaptive edge threshold and a luminance threshold. The edge flag for the pixel is set only upon the pixel gradient being greater than the adaptive edge threshold, and being greater than the luminance threshold.

To generate the luminance threshold, a background luminance measure for the pixel is generated. The luminance threshold is proportional to the background luminance measure. The background luminance measure is generated by averaging luminance components in a window about the pixel. In one embodiment, the window is a three-by-three pixel window with the pixel centered in the three-by-three pixel window. The luminance threshold is defined as the maximum of a minimum luminance threshold and an adjusted luminance measure.

The pixel gradient is generated from a plurality of spatial gradients for the pixel again using pixels in the window about the pixel. In one embodiment the plurality of spatial gradients comprise two spatial gradients and in another embodiment four spatial gradients. The plurality of spatial gradients are combined to obtain the pixel gradient.

The adaptive edge threshold is generated by first generating an edge estimator for a plurality of edges through the pixel to obtain a plurality of edge estimators. Again, pixels in a window about the pixel is used to generate the plurality of edge estimators. In one embodiment the plurality of edge estimators are two pixel texture estimators and in another embodiment four pixel texture estimators. The plurality of edge estimators are combined to obtain the adaptive edge threshold.

The plurality of edge classifications used in the filtering process includes an edge classification, and the pixel is assigned to edge classification if the edge flag for the pixel in the edge map indicates that the pixel is an edge pixel. A pixel assigned an edge classification is unchanged by the filtering process.

Another classification in the plurality of edge classifications is an edge border classification. A pixel is assigned the edge border classification if (i) the edge flag for at least three pixels in a window of pixels about the pixel are not set; and (ii) the pixel is in a line of pixels in the window and the edge flag for each pixel in the line is not set. A pixel assigned the edge border classification is filtered in a one-dimensional filter that processes the line of pixels.

Yet another classification in the plurality of edge classifications is a shade classification. A pixel is assigned the shade classification if the edge flag for the pixel and each pixel in a window of pixels about the pixel is not set. A pixel assigned the shade classification is filtered in a two-dimensional filter that processes the window of pixels.

In one embodiment, the digital noise reduction unit and artifact reduction unit of this invention are used in a transform artifact reduction method for decoded video pixel data, that includes:

digitally noise reducing a block of pixels to obtain a digitally noise reduced block of pixels;

setting a replenished block flag to a predetermined state upon determining that the digitally noise reduced block of pixels is a replenished block;

identifying each pixel in the digitally noise reduced block of pixels as one of an edge pixel and not edge pixel;

classifying each pixel that was identified as not edge pixel as one of a texture pixel and not texture pixel;

setting an edge block flag to a predetermined state upon the digitally noise reduced block having a predetermined number of pixels identified as edge pixels;

setting a texture block flag to a predetermined state upon the digitally noise reduced block having a predetermined number of pixels classified as texture pixels; and filtering the digitally noise reduced block of pixels using a spatially-variant filter when any one of the block texture flag, the block edge flag, and the block replenish flag is set to the predetermined state.

The operations in each of the various processes are similar to those described above.

The processes described above utilize the edge detection method for transform artifact reduction that includes comparing a pixel gradient for a pixel with a threshold, and setting an edge flag for the pixel in an edge map upon the pixel gradient being greater than the threshold. The specific details of one embodiment of the process are described above.

The processes described above also utilize the novel method for spatially-variant filtering to reduce transform artifacts that includes:

assigning a pixel in a block of pixels one classification in a plurality of edge classifications using edge flags in an edge map for pixels in a window about the pixel wherein an edge flag for a pixel is set in the edge map to indicate the pixel is in an edge of a video image; and filtering each pixel in the block of pixels based upon the assigned classification to reduce transform artifacts in the video image.

The specific details of this process are also described above. In the filtering process pixels directly adjacent to edges are not processed with the two-dimensional filter because such a filter would include pixels from either side of an edge. However, it is desirable to clean up the area next to edges (edge border areas) to the maximum extent possible without smearing the edges since this results in clean sharp edges which are critical to the perceived quality of an image. Thus, if at least three pixels in the window including the current pixel are not edge pixels, the window is examined to see if all the pixels lying along one of the four possible axes through the window are not edge pixels. If an axis is made up of non-edge pixels, the pixels on that axis are processed with a one-dimensional filter. The four possible axes are checked sequentially and the directional filtering is performed along the first axis along which all the pixels are not-edge pixels. Axis examination is stopped after the first axis along which filtering is allowed is found. Although adjacent pixels are not examined for continuity of direction, axis examination always proceeds in the order shown above. This ensures that adjacent pixels are classified similarly if ambiguity in classification exists.

This process of axis selection and resultant one-dimensional directional filtering is equivalent to finding pixels adjacent to the edges, i.e, finding edge border areas, and filtering pixels in the edge border areas along a direction parallel to the edges. This technique also provides edge enhancement.

Edge pixels and pixels directly adjacent to the edge pixels that are not selected for one-dimensional directional filtering are not post-processed. Leaving these pixels unchanged ensures that sharpness of edges in the decoded image is not degraded by post-processing. This implies that the pixels adjacent to edges which do not qualify for one-dimensional directional filtering are also treated like edges. This is equivalent to coalescing edge segments with a small discontinuity (1 to 2 pixels) into continuous contours. Therefore, the pixel classification process in the filtering process compensates for the lack of edge linking and tracing and allows the post-processor to effectively use an edge map equivalent to those generated by more complex edge detectors.

The artifact reduction unit of this invention was successful in eliminating most of the coding artifacts while preserving edges. The visual improvement in the quality of low to medium bit rate coded images was striking. Extensive simulations show that the artifact reduction unit substantially and dramatically improves the performance of low to medium bit rate video codecs by cleaning coding artifacts while preserving edge sharpness. The post-processor is independent of the encoder. Therefore, the post-processor can be added to any video receiver between decoder and display modules to enhance the displayed image.

BRIEF DESCRIPTION OF THE DRAWINGS

FIG. 7 illustrates the representations used for the pixels in the 3×3 windows utilized in this invention.

FIG. 8 illustrates the various edges that are detected in the 3×3 window according to the principles of this invention.

DETAILED DESCRIPTION

According to the principles of this invention, a post-processor 300 overcomes the limitations of both spatially invariant filtering and spatially-variant filtering of prior art post-processors. This novel post-processor 300 cleans up mosquito noise and eliminates blocking artifacts while preserving image sharpness. Preferably, post-processor 300 uses both temporal and edge characteristics of a video image to enhance the displayed image. However, post-processing based only upon edge characteristics, as described more completely later, represents a significant improvement over the prior art post-processors that utilized spatially invariant filtering.

Figure 1:
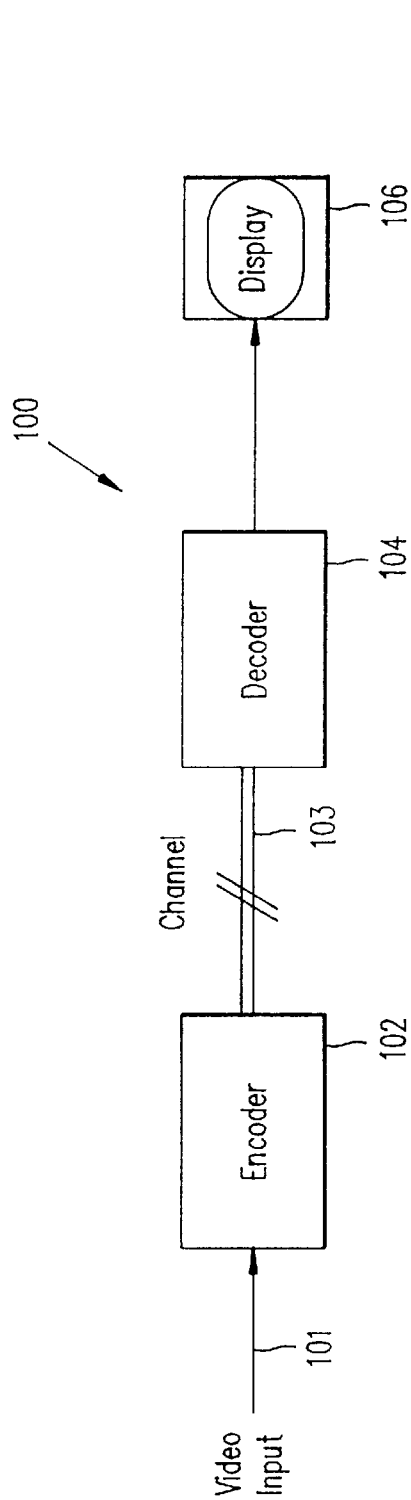
FIG. 1 is a block diagram of a prior art video communication system without post-processing.
Figure 2:
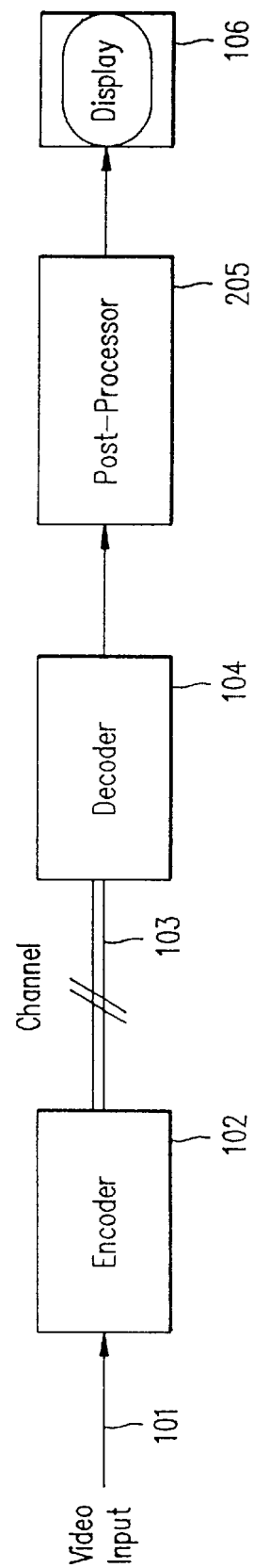
FIG. 2 is a block diagram of a prior art video communication system with post-processing.
Figure 3:
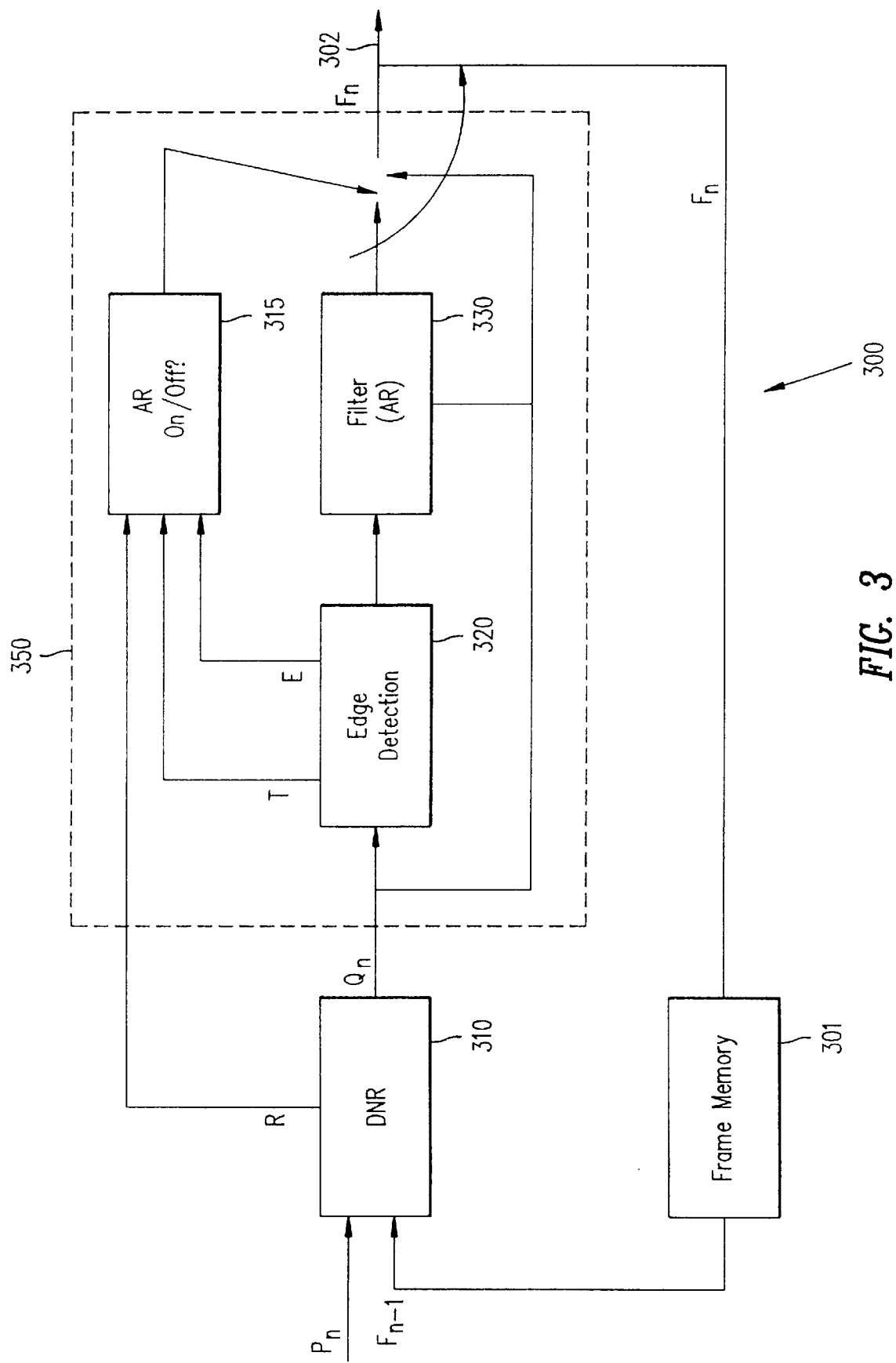
FIG. 3 is a block diagram of a novel post-processor according to the principles of this invention for use in video communication systems such as those illustrated in FIG. 1.

FIG. 3 is a block diagram of one embodiment of post-processor 300 of this invention. Post-processor 300 operates on a current frame of pixel data Pn using information from the immediately preceding post-processed frame Fn_1 that is stored in a frame memory 301. Since the human eye can easily discern textures and fine details in stationary areas within an image sequence, post-processor 300 preserves textures and low-level details in these stationary areas. Only stationary areas are of concern, because motion masking is such that texture loss is not noticed in the moving areas.

Specifically, post-processor 300, as explained more completely below, first identifies texture and fine detail areas in the decoded image, hereinafter, image. Post-processor 300 uses artifact reduction only on portions of the image that are not part of an edge, and are not part of a texture or fine detail area. Since artifact reduction is not utilized on these areas by post-processor 300, the post-processed image is not softened in regions where it is easily noticed by the human eye.

Post-processor 300 has two major components, a digital noise reduction unit 310 and an artifact reduction unit 350. As explained more completely below, digital noise reduction unit 310 attenuates small differences between each arriving pixel and the corresponding pixel from preceding frame Fn_1 in frame memory 301.

Artifact reduction unit 350 first identifies a pixel as one of an edge pixel and a non-edge pixel and sets an edge flag in an edge map for the pixel if the pixel is identified as an edge pixel. Using the edge map information for a current pixel and the pixels in a window surrounding the current pixel, artifact reduction unit 350 classifies the current pixel as one of an edge pixel, an edge boundary pixel, and a shade pixel. Edge pixels are not filtered by artifact reduction unit 350. Edge boundary pixels are filtered with a one-dimensional filter, and shade pixels are filtered with a two-dimensional filter.

Performing this spatially-variant filtering using only information in an edge map for a window about the current pixel provides a significant reduction in blocking artifacts, as described more completely below. The combination of digital noise reduction and the spatially-variant filtering of artifact reduction unit 350 provides an even better reduction in blocking artifacts and mosquito noise.

Thus, in this embodiment, post-processor 300 first uses a digital noise reduction unit 310 to attenuate small differences between each arriving pixel and the corresponding pixel from preceding frame Fn_1 in frame memory 301. Digital noise reduction unit 310 treats small differences between pixels in corresponding frames as noise and minimizes these small differences. Larger pixel differences are treated as signal and are not attenuated by digital noise reduction unit 310.

As is known to those skilled in the art, frame Fn__1 is a two-dimensional array of pixel data in frame memory 301 and (n__1) is a temporal index that denotes the (n−1)th frame in a time sequence of frames where n can take on any value from one for the second frame in the time sequence to (N) where N is the last frame in the time sequence. Pixel Fn__1 (i,j) is a pixel in the frame for the temporal time (n−1) in the ith row and jth column. In this embodiment, frame Fn__1 in memory has been processed by post-processor 300.

Similarly frame Pn is a two-dimensional array of decoded pixel data that is available from the decoder where again n is a temporal index that denotes the nth frame from the decoder in a time sequence of frames where n can take on any value from 1 for the first frame in the time sequence to N for the last frame in the time sequence. Pixel Pn(i,j) is a pixel in the frame for the temporal time n in the ith row and jth column.

Output pixel Qn(i,j) from digital noise reduction unit for input pixel Pn(i,j) is:

$$Qn(i,j)=Fn\_1(i,j)+f(dn(i,j)) \quad (1)$$

where f ( ) is a predetermined digital noise reduction function; and $$dn(i,j)=(Pn(i,j)-Fn\_1(i,j)) \quad (2)$$

The value of digital noise reduction function f(dn(i,j)) is obtained from a stored look-up table, in this embodiment, based on digital pixel difference dn(i,j). Since digital noise reduction unit 310 uses frame Fn__1 (i,j) from post-processor 300 rather than the previous frame Pn__1(i,j) from the decoder, the digital noise reduction is recursive.

One embodiment of a look-up table suitable for use with this invention is given in Table 1. If the absolute value of digital pixel difference dn(i,j) is less that sixteen, digital noise reduced output pixel Qn(i,j) is closer to Fn__1(i,j) than Pn(i,j). Conversely, if the absolute value of digital pixel difference dn(i,j) is greater than or equal to sixteen, digital noise reduced output pixel Qn(i,j) is the same as input pixel Pn(i,j). Thus, where the difference between current input pixel Pn(i,j) and the corresponding pixel in the previous post-processed frame, i.e, pixel Fn__1(i,j) is between −16 and +16, current input pixel Pn(i,j) is modified so that frame-to-frame pixel differences are reduced.

Table 1 gives the values of digital noise reduction function f(dn) for positive digital pixel differences dn(i,j). Corresponding values of digital noise reduction function f(dn) for negative digital pixel differences dn(i,j) are obtained by placing negative signs on digital pixel difference dn and digital noise reduction function f(dn) in Table 1.

TABLE 1

Digital Noise Reduction Look-Up Table

| dn | f (dn) |
|---|---|
| 0 | 0 |
| 1 | 0 |
| 2 | 1 |
| 3 | 1 |
| 4 | 2 |
| 5 | 2 |
| 6 | 3 |
| 7 | 3 |
| 8 | 4 |
| 9 | 5 |
| 10 | 7 |
| 11 | 8 |
| 12 | 9 |
| 13 | 11 |
| 14 | 12 |
| 15 | 14 |
| 15> | $d_n$ |

TABLE 1-continued

Digital noise reduction unit 310 also identifies unchanged (stationary) areas in the image in this embodiment. The unchanged areas are replenished blocks which are generated simply by copying the block at the same location from the previous frame in the decoder. Thus, in this embodiment, post-processor 300 subdivides each frame into blocks and digital noise reduction unit 310 classifies each block individually as stationary or non-stationary, i,e., as a replenished or non-replenished block.

In this embodiment, digital pixel difference dn(i,j) in digital noise reduction unit 310 is tested against a replenished threshold. If digital pixel difference dn(i,j) is less than the replenished threshold for all pixels in the block, a replenished block flag Rb is set for the block and otherwise, the replenished block flag is not set. Thus, in this embodiment, replenished blocks are identified by examining pixel differences between current frame Pn from the decoder and previous frame Fn__1 from postprocessor 300.

After digital noise reduction unit 310 processes a block and the block is flagged as replenished or non-replenished, the block is available for further processing. Initially, in the further processing, the noise reduced block is processed in an edge detection unit 320 within artifact reduction unit 350. As indicated above, each pixel in the noise reduced block is classified either as an edge pixel or a non-edge pixel, i.e., an edge map is generated, by edge detection unit 320. Specifically, edge detection unit 320 determines whether a pixel is on an edge in a block of frame Qn. Herein, an edge refers to a characteristic of the video image represented by the frame and not a physical edge of the frame.

As explained more completely below, in one embodiment, edge detection unit 320 first compares a pixel gradient for the current pixel with a threshold, preferably an adaptive edge threshold. An edge flag in the edge map for the current pixel is set if the pixel gradient is greater than the threshold.

In the process of generating the pixel gradient, a set of edge estimators are generated. In this embodiment, the edge estimators include pixel texture estimators T1(i,j) and T1(i, j). Specifically, as each block is processed by edge detection unit 320, pairwise pixel texture estimators T1(i,j) and T1(i,j) along a first axis and a second axis, respectively, are generated for the pixel. Here, the second axis is perpendicular to the first axis. In this embodiment, the pairwise pixel texture estimators T1(i,j) and T1(i,j) for a pixel are combined to form a texture estimator. If the texture estimator is greater than a texture pixel threshold, and the pixel is not an edge pixel, a texture pixel counter is incremented for the block, i.e, the pixel is identified as a texture pixel.

After each pixel in the block is processed in edge detection unit 320, edge detection unit 320 sets an edge block flag Eb for a block when the block has more edge pixels than an edge block threshold. The state of edge block flag Eb distinguishes blocks with edges from blocks without edges. Since blocks with edges have substantial mosquito noise, blocks with the block edge flag set are always post-processed, even though these blocks may have fine details or textures.

Also after each pixel in the block is processed in edge detection unit 320, if the value of texture pixel counter is greater than a texture block threshold, a block texture flag Tb is set for the block.

Thus, after a block is processed by edge detection unit 320, a replenish flag Rb, a block texture flag Tb, and a block edge flag Eb have either been set or left cleared, and each pixel has been identified as an edge pixel or a not edge pixel. The three flags are provided to an artifact reduction control unit 315 in artifact reduction unit 350.

If both the replenish and texture flags are set and the edge flag is not set, artifact reduction control unit 315 connects digital noise reduction unit 310 to frame memory 301 and to post-processor 300 output bus 302 to an output buffer. Thus, the digitally noise reduced block is copied to the output buffer and frame memory 301 without modification.

If the edge flag is set, artifact reduction control unit 350 connects the output bus of switched filter unit 330 to frame memory 301 and to postprocessor output bus 302. Thus, the block copied to frame memory 301 has had both artifact reduction, that is described more completely below, and digital noise reduction.

Switched filter unit 330 in artifact reduction unit 350 uses the edge map generated by edge detection unit 320 to determine the filtering applied to each pixel in each block. Specifically, as explained more completely below, a decision is made on the processing applied to each pixel in the block by examining the edge map of pixels within a three-by-three pixel (3×3) window surrounding the current pixel. The use of edge information in a 3×3 window requires edge information for the pixels that form a one pixel border around the current window. Thus, edge detection unit 320 must provide edge information for both the current block and a one pixel boundary surrounding the current block. Consequently, overlapping blocks are used by post-processor 300, as explained more completely below.

Switched filter unit 330 performs the pixel classification described above. Specifically, switched filter unit 330 classifies a pixel as either from an edge, edge boundary, or "shade" (smooth) area. Pixels along edges are left unchanged by unit 330. Pixels along edge boundaries are directionally filtered with a one-dimensional filter. Shade pixels are low pass filtered with a two-dimensional filter by unit 330. Thus, pixels are selectively filtered depending on their classification. To prevent edge smearing, the filtering ensures that pixels from different sides of an edge are not mixed. Thus, artifact reduction unit 350 utilizes "spatially-variant switched filtering".

Figure 4:
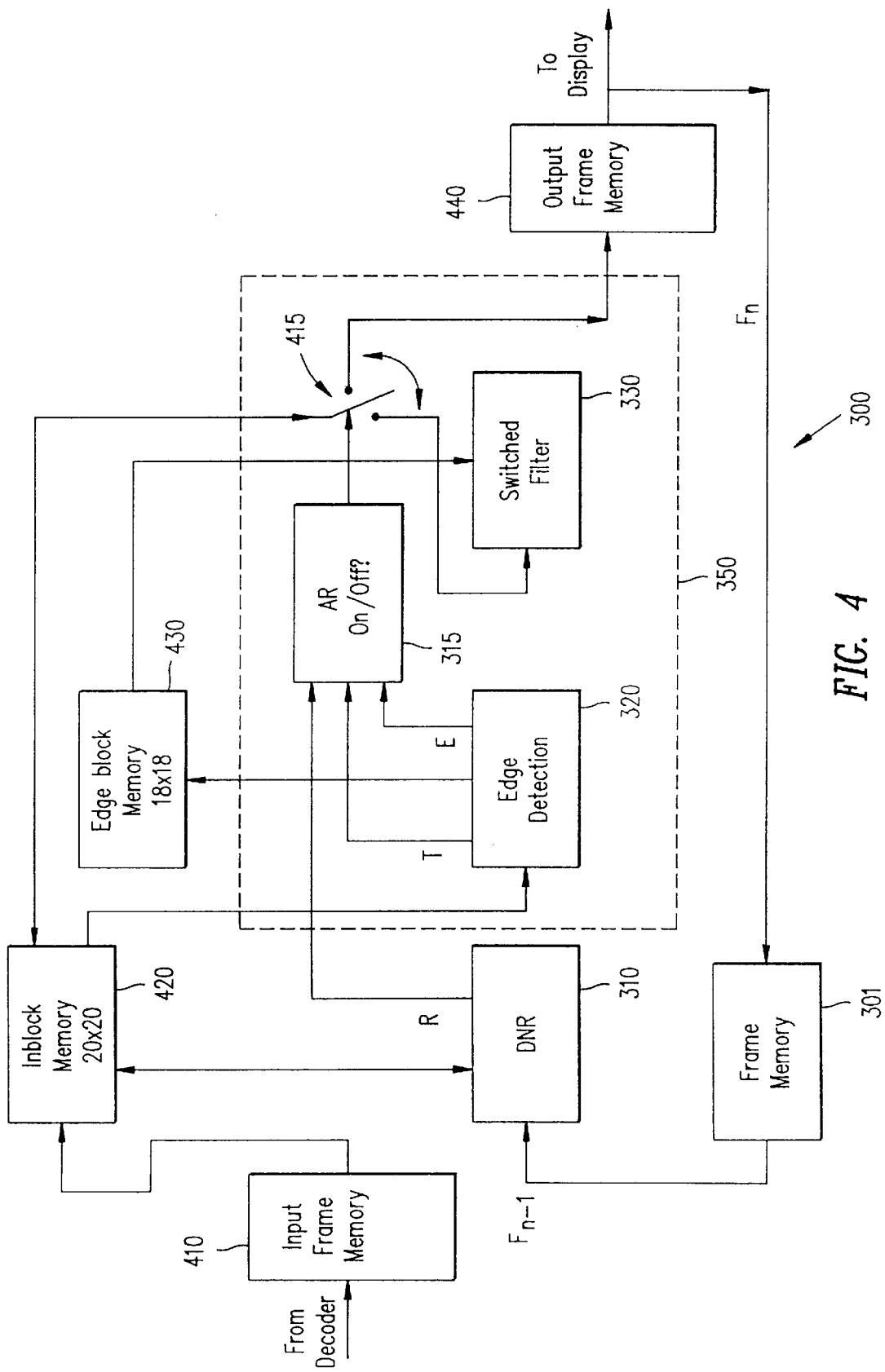
FIG. 4 is a more detailed block diagram of one embodiment of the post-processor of this invention.

FIG. 4 is a more detailed block diagram of one embodiment of post-processor 300 that combines digital noise reduction and artifact reduction with block classification. FIGS. 5A to 5D are process flow diagrams of one embodiment of the operations performed by the various units in FIG. 4.

When post-processor 300 starts to process a sequence of frames in a sequence, the zeroth frame is written to an input frame memory 410. Initialize frame memory process 501 detects that a new sequence is starting and copies the zeroth frame from input frame memory to output frame memory 440 and to frame memory 301. Thus, the zeroth frame is not processed by digital noise reduction unit 301 and artifact reduction unit 350.

After the zeroth frame is processed in initialize frame memory process 501, post-processor 300 transfers to initialize frame process 502. Each subsequent frame in the sequence is processed by post-processor 300 as described below.

In this embodiment, a block size of sixteen-by-sixteen pixels is used since standard codecs (H.261,MPEG) use this block size for motion compensation and replenishment decisions, and is referred to as the current block. Thus, initialize frame process 502 divides the frame in input frame memory 410 into sixteen-by-sixteen pixel blocks for subsequent processing and transfers to load block process 503.

Load block process 503 copies the current sixteen-by-sixteen pixel block from input frame memory 410 to in-block memory 420. The size of in-block memory 420 is determined by the block size selected for processing and the requirements of edge detection unit 320 and switched filter unit 330.

As explained above, switched filter unit 330 requires edge information in a one pixel border about the current block and so edge information is required for an eighteen pixel by eighteen pixel block. As explained more completely below, edge detection unit 320 uses a three-by-three pixel window about the current pixel to determine whether the current pixel is an edge pixel. Consequently, in this embodiment, a two pixel border is required about the current block and so load block process 503 copies a twenty-by-twenty pixel block within which the current block is centered from input frame memory 410 to in-block memory 420 for all blocks that are not along the frame boundary.

If the current block lies along the frame boundary, load block process 503 can not copy a full twenty-by-twenty pixel block to in-block memory 420 within which the current block is centered. Rather, a different size block is copied that contains the current block and then pixels in in-block memory 420 for which no pixel data is available are initialized either by using pixel information in the copied block, or by setting the pixel locations to a known value, for example. Each of the situations in which a full twenty-by-twenty pixel block can not be copied to in-block memory 420 are described below.

When the current sixteen-by-sixteen pixel block is located in a corner of the frame, only an eighteen-by-eighteen pixel block is copied. A twenty pixel wide- by-eighteen pixel high block is copied if the current block is not a corner block and is along either the top or bottom edge of the frame. An eighteen pixel wide-by-twenty pixel high block is copied if the current block is not a corner block and is along either side edge of the frame. In each of these cases, the copied block is appropriately located within in-block memory 420. Upon completion of load block process 503, processing transfers to frame boundary check 504.

If the current block lies along an edge of the frame, frame boundary check 504 transfers processing to replicate pixels process 505 and otherwise to initialize edge map 506. If the current block lies along a frame boundary, some of the pixel locations within in-block memory 420 contain arbitrary values. Thus, replicate pixels process 505 copies the pixels along the frame boundary into the two rows, two columns, or both of pixel locations within in-block memory 420 that are outside of the frame boundary. The corner pixel of the current block is used to fill in the pixel border in the corner regions. After the appropriate pixels are replicated, replicate pixel process 505 also transfers to initialize edge map process 506.

In initialize edge map process 506, each location in edge-block memory 430 is set to a predetermined value, i.e., edge-block memory 430 is initialized. Specifically, if the pixel in in-block memory 420 corresponding to the location in edge-block memory 430 is a replicated pixel, the location in edge-block memory 430 is set to indicate an edge pixel, i.e, an edge flag is set, and otherwise the location in edge-block memory 430 is set to indicate not an edge pixel. Also, in this embodiment, a replacement flag Rb is set, i.e, replacement flag Rb is set to a first predetermined state.

The size of edge-block memory is determined by the current block size and the number of pixels required to classify each pixel in switched filter 330. Since in this embodiment, the current block size is sixteen-by-sixteen pixels, and edge information in a three-by-three pixel window about the current pixel is required, edge-block memory 430 is eighteen-by-eighteen pixels.

Upon completion of initialize edge map 506 all the necessary initialization for processing of a block is complete, and so digital noise reduction unit 310 initiates processing of the information in in-block memory 420, in this embodiment. Of course, if digital noise reduction is either unnecessary or unwanted, digital noise reduction unit 310 could be eliminated. In this case, artifact reduction unit 350 would initiate processing of the information in in-block memory 420, as described more completely below.

Figure 5A:
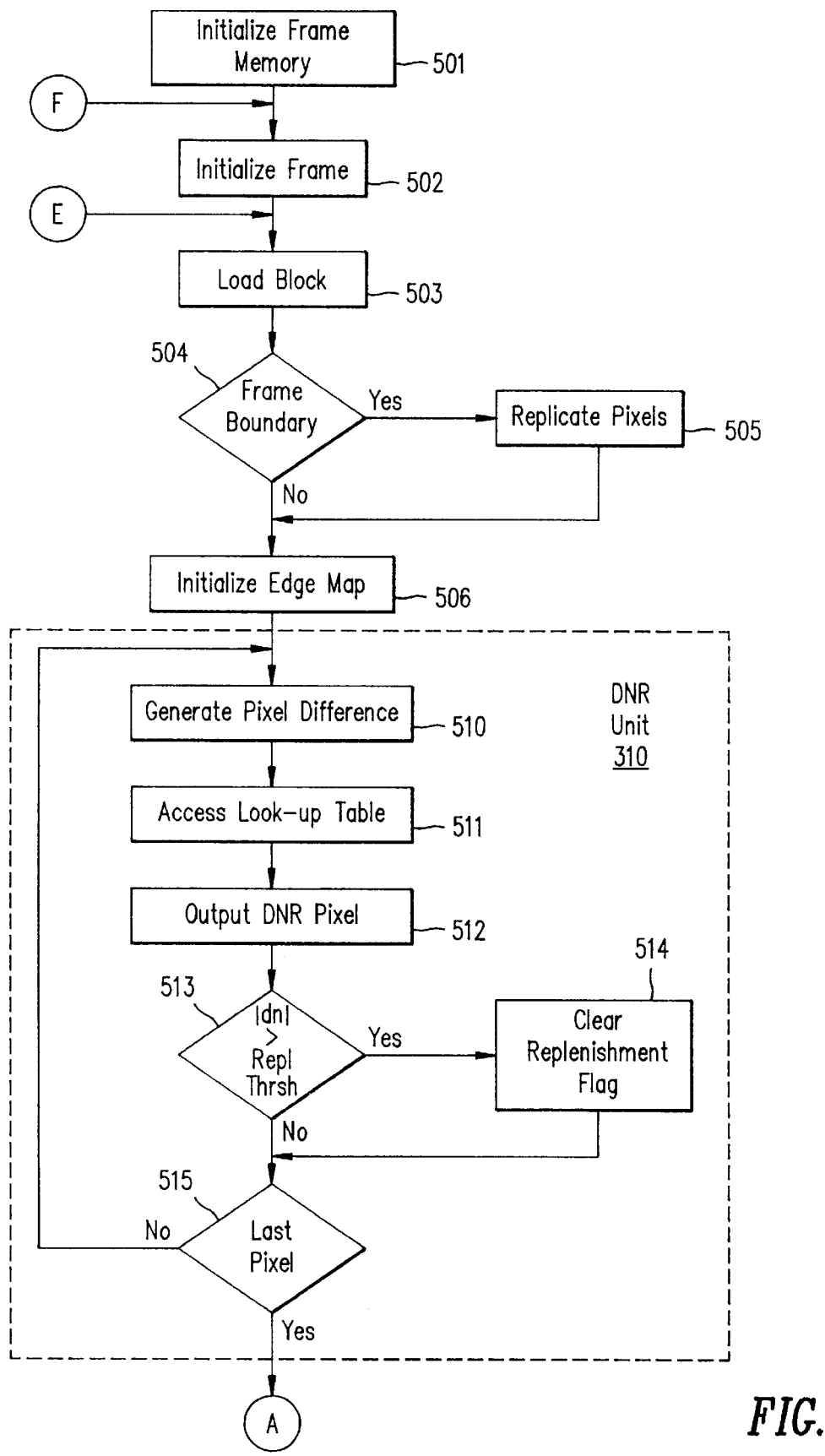
FIG. 5A is a process flow diagram of the initialization process of the post-processor of FIG. 4 and of one embodiment of the operations of the digital noise reduction unit.

One embodiment of the process performed by digital noise reduction unit 310 is illustrated in FIG. 5A. Generate pixel difference process 510 generates digital pixel difference $dn(i,j)$, as defined above, using the current pixel from in-block memory 420 and the corresponding pixel from frame memory 301. Upon generation of digital pixel difference $dn(i,j)$ processing transfers to access look-up table 511.

In this embodiment, Table 1 as defined above is stored in a memory of post-processor 300. Thus, in process 511, digital pixel difference $dn(i,j)$ is used as an index to access the appropriate value of digital noise reduction function $f(dn)$ in the look-up table memory. Upon completion of access look-up table 511, processing transfers to output DNR pixel process 512.

In output DNR pixel process 512, output pixel $Qn(i,j)$ is generated according to expression (1) above and loaded in the appropriate location of in-block memory 420. Thus, the pixel in in-block memory 420 is replaced by a noise reduced pixel and processing transfers to digital pixel difference check 513.

In digital pixel difference check 513, digital pixel difference $dn(i,j)$ for the current pixel is compared with a replenished threshold REPLTHRSH. If digital pixel difference $dn(i,j)$ is greater than replenished threshold REPLTHRSH, the current pixel is assumed to be a new pixel and processing transfers to clear replenishment flag step 514, which in turn changes the state of replenishment flag Rb to cleared, i.e., to a second state, and then transfers to last pixel check 515.

Conversely, if digital pixel difference $dn(i,j)$ is less than replenished threshold REPLTHRSH, processing transfers directly from check 513 to last pixel check 515. In this embodiment, replenishment threshold REPLTHRSH is taken as five. Recall that frame memory 301 contains post-processed pixels rather than pixels from the original previous frame. Since the post-processed pixels are different from the pixels in input frame memory 410, replenishment threshold REPLTHRSH is preferably take as a small positive threshold rather than zero. Alternatively, the replenishment processing in DNR unit 310 could be eliminated and other techniques used by post-processor 300 to identify replenished blocks.

Last pixel check 515 determines whether each pixel within the current sixteen-by-sixteen pixel block in in-block memory 420 has been processed by digital noise reduction unit 310. If an additional pixel or pixels remain to be processed, processes 510 to 515 are repeated until all pixels within the current block in memory 420 are processed. When all these pixels in memory 420 have been processed, the current block of pixels has been replaced with digitally noise reduced pixels. Also, if the digital pixel difference between every pixel in the current block and the corresponding pixel in reference frame memory 301 is less than replenishment threshold REPLTRSH, replenishment flag Rb is true, and otherwise replenishment flag Rb is false.

Figure 5B:
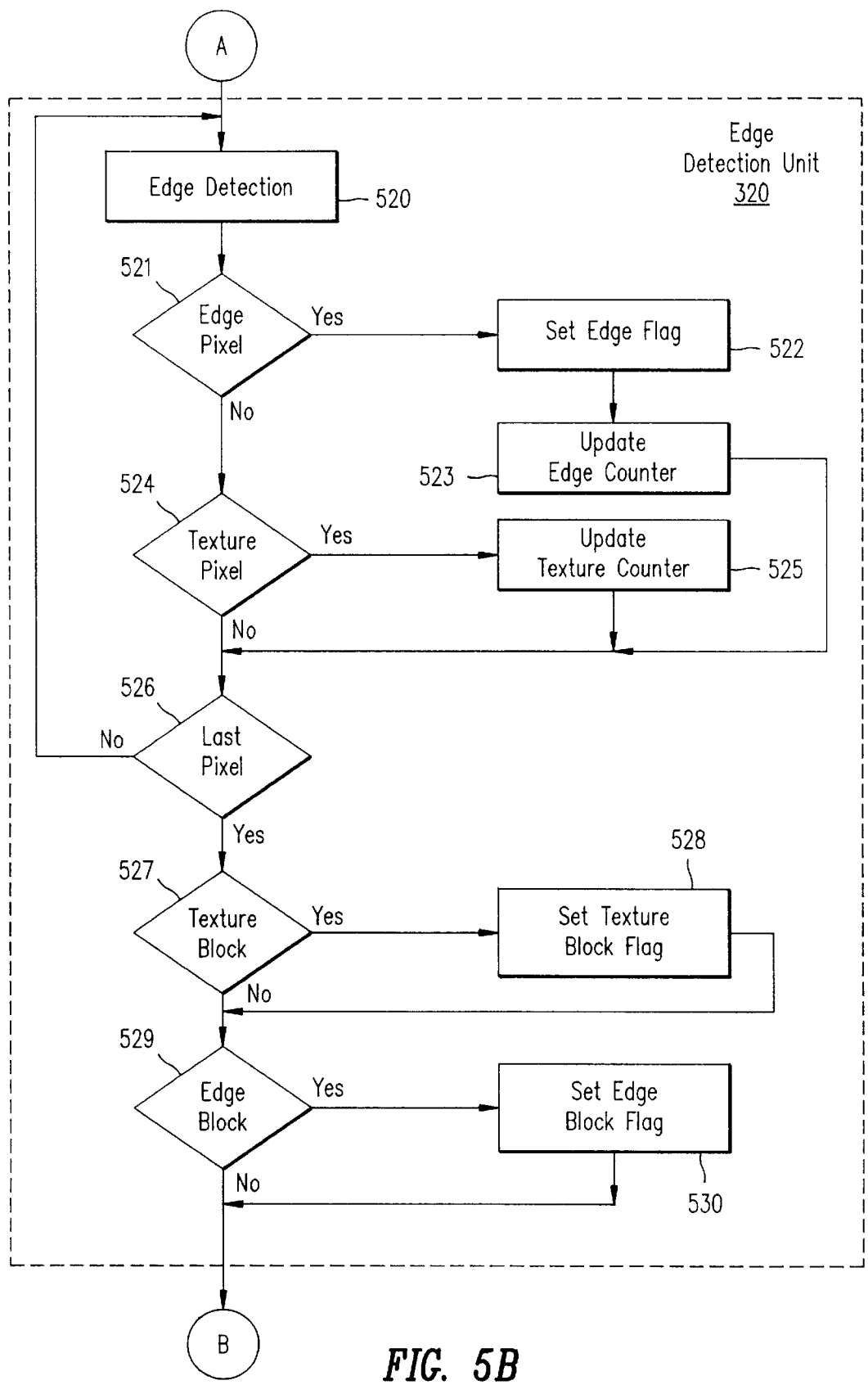
FIG. 5B is a continuation of the process flow diagram of FIG. 5A that illustrates one embodiment of the operations of the edge detection unit.

One embodiment of the process performed by edge detection unit 320 is illustrated in FIG. 5B. In this embodiment, upon entry to edge detection unit 320, an edge counter and a texture counter are initialized, and a texture block flag Tb and an edge block flag Eb are both cleared, i.e, set to a first predetermined state. Each pixel within an eighteen-by-eighteen pixel window centered within in-block memory 420 is processed by edge detection unit 320.

Initially, the current pixel within the eighteen-by-eighteen pixel window is processed by edge detector process 520, as described more completely below, unless the edge flag for the pixel in edge-block memory 430 is already set. If the edge flag is already set, a pointer to the current pixel is incremented, and edge detector process 520 is initiated again. Thus, edge detector process 520 as well as processes 521 to 526 are performed only for pixels that do not have the edge flag already set, i.e, only for non-replicated pixels.

Edge detector process 520 uses a three-by-three pixel window about the current pixel, i.e., a total of nine pixels, to determine whether there is an edge of the image that goes through the current pixel. A plurality of spatial gradients are generated for the current pixel. The plurality of spatial gradients are combined to generate a pixel gradient.

The pixel gradient is compared to a threshold, that preferably includes an adaptive edge threshold, to identify the pixel as either an edge pixel or a not-edge pixel. If the pixel gradient is greater than the threshold, the pixel is identified as an edge pixel.

As explained more completely below, to generate the adaptive edge threshold, the pixel information in the window about the current pixel is used to generate an edge estimator for each of a plurality of possible edges through the current pixel. In one embodiment, the edge estimators are pairwise pixel texture estimators $T1(i,j)$ and $T1(i,j)$ for the current pixel along a first axis and a second axis, and the adaptive edge threshold is called an adaptive texture threshold. The plurality of edge estimators are combined to form the adaptive edge threshold.

In this embodiment, the pixel information in the three-by-three pixel window about the current pixel is also used to generate a luminance threshold. Thus, a pixel is identified as an edge pixel if the pixel gradient for the pixel is greater than both the adaptive edge threshold and the luminance threshold.

Thus, if an edge goes through the current pixel, the current pixel is identified as an edge pixel by edge detector process 520 and otherwise the current pixel is identified as a not-edge pixel. Upon competition of processing of a pixel by edge detector process 520, processing transfers to edge pixel check 521. If the current pixel is an edge pixel, check 521 transfers processing to set edge flag 522 and otherwise to texture pixel check 524.

Set edge flag 521 sets the edge flag for the current pixel in edge-block memory 430 and transfers processing to update edge counter 523. Update edge counter 523 changes the value of the edge counter, e.g.,increments the edge counter, to indicate the number of edge pixels in the current block including the current pixel. Update edge counter 523 also transfers processing to last pixel check 526, that is described below.

If the current pixel is not an edge pixel, edge pixel check 524 transferred processing to texture pixel check 524. If the sum of the pairwise pixel texture estimators T1(i,j) and T1(i,j) for the current pixel is greater than a texture pixel threshold VARTHRSH, the pixel is classified as a texture pixel, and so texture pixel check transfers processing to update texture counter 525 and otherwise to last pixel check 526.

In this embodiment, texture pixel threshold VARTHRSH is a function of the location of the current pixel with the current block. Typically, an eight-by-eight pixel block size is used for transform coding. Thus, within the current block, there may be blocking artifacts along the edges of the eight-by-eight pixel block. To prevent these blocking artifacts from contributing to texture pixels, texture pixel threshold VARTHRSH is set to five for pixels not on eight-by-eight pixel block borders, and is set eight for pixels on eight-by-eight pixel block borders.

In update texture counter 525, the value of the texture counter is changed, e.g.,incremented, to indicate the number of texture pixels in the current block including the current pixel that are not edge pixels. Update texture counter 525 transfers processing to last pixel check 526.

Last pixel check 526 determines whether each pixel in the eighteen-by-eighteen pixel block centered in in-block memory 420 has been processed by edge detection unit 320. If an additional pixel or pixels remain to be processed, processes 520 to 526 are repeated, as appropriate, until all pixels within the eighteen-by-eighteen pixel block are processed. When all pixels in the block have been processed, last pixel check 526 transfers to texture block check 527.

Upon entering texture block check 527, the edge map in edge-block memory 430 is updated for the current block and the edge and texture counters reflect the number of edge pixels and texture pixels, respectively within the current block. If the value of the texture counter is greater than a block texture pixels threshold NUMVARTHRSH, check 527 transfers processing to set block texture flag 528, which in turns sets the block texture flag Tb, and otherwise to edge block check 529. In this embodiment, block texture pixels threshold NUMVARTHRSH is taken as sixteen. Herein block texture pixels threshold NUMVARTHRSH was determined empirically. Experiments were performed on a set of images and the threshold which provided results most consistent with human perception was selected. Upon completion of set texture block flag 528, processing transfers to edge block check 315.

In edge block check 529, edge block check 529 determines whether the value of the edge counter is greater than a block edge pixels threshold NUMEDGETHRSH. If the value of the edge counter is greater than block edge pixels threshold NUMEDGETHRSH, check 529 transfers processing to set edge block flag 528, which in turns sets block edge flag Eb, and otherwise to artifact control unit 315. In this embodiment, block edge pixel threshold NUMEDGETHRSH is taken as eight. Block edge pixel threshold NUMEDGETHRSH also was determined empirically. Experiments were performed on a set of images and the threshold which provided results most consistent with human perception was selected. Upon completion of set edge block flag 530, processing transfers to artifact reduction control unit 315.

Figure 5C:
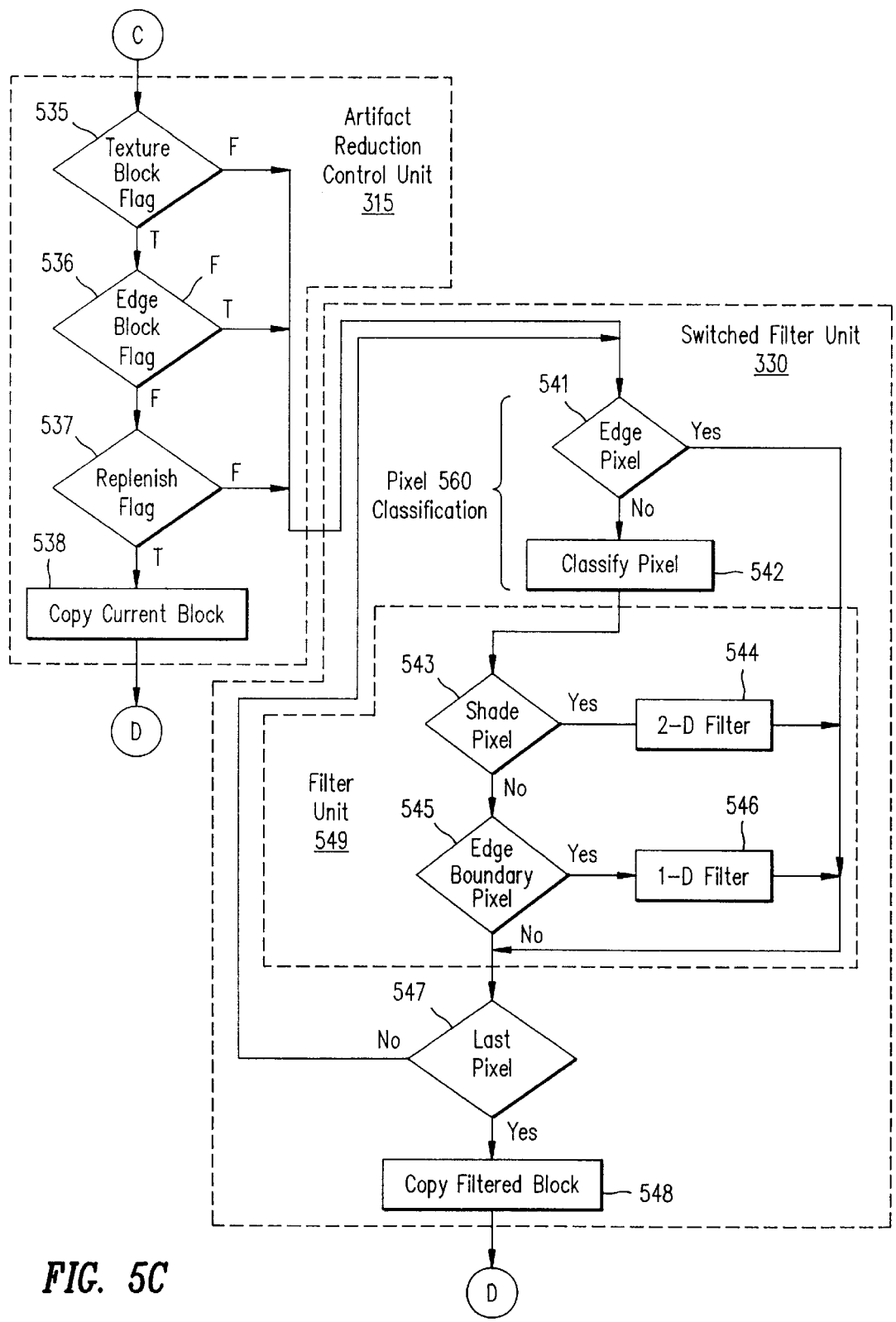
FIG. 5C is a continuation of the process flow diagram of FIGS. 5A and 5B that illustrates one embodiment of the operations of the artifact reduction control unit and the switched filter unit.

FIG. 5C illustrates one embodiment of the process performed by artifact reduction control unit 315. Initially, in block texture flag check 535, the state of block texture flag Tb is analyzed. If block texture flag Tb is true processing transfers from check 535 to block edge flag check 536, and otherwise to switched filter unit 330.

In block edge flag check 536, the state of block edge flag Eb is analyzed. If block edge flag Eb is false processing transfers from check 536 to replenishment flag check 537, and otherwise to switched filter unit 330.

In replenish flag check 537, the state of replenishment flag Rb is analyzed. If replenishment flag Rb is true, processing transfers from check 537 to copy current block 538, and otherwise to switched filter unit 330.

Figures 5D, 6:
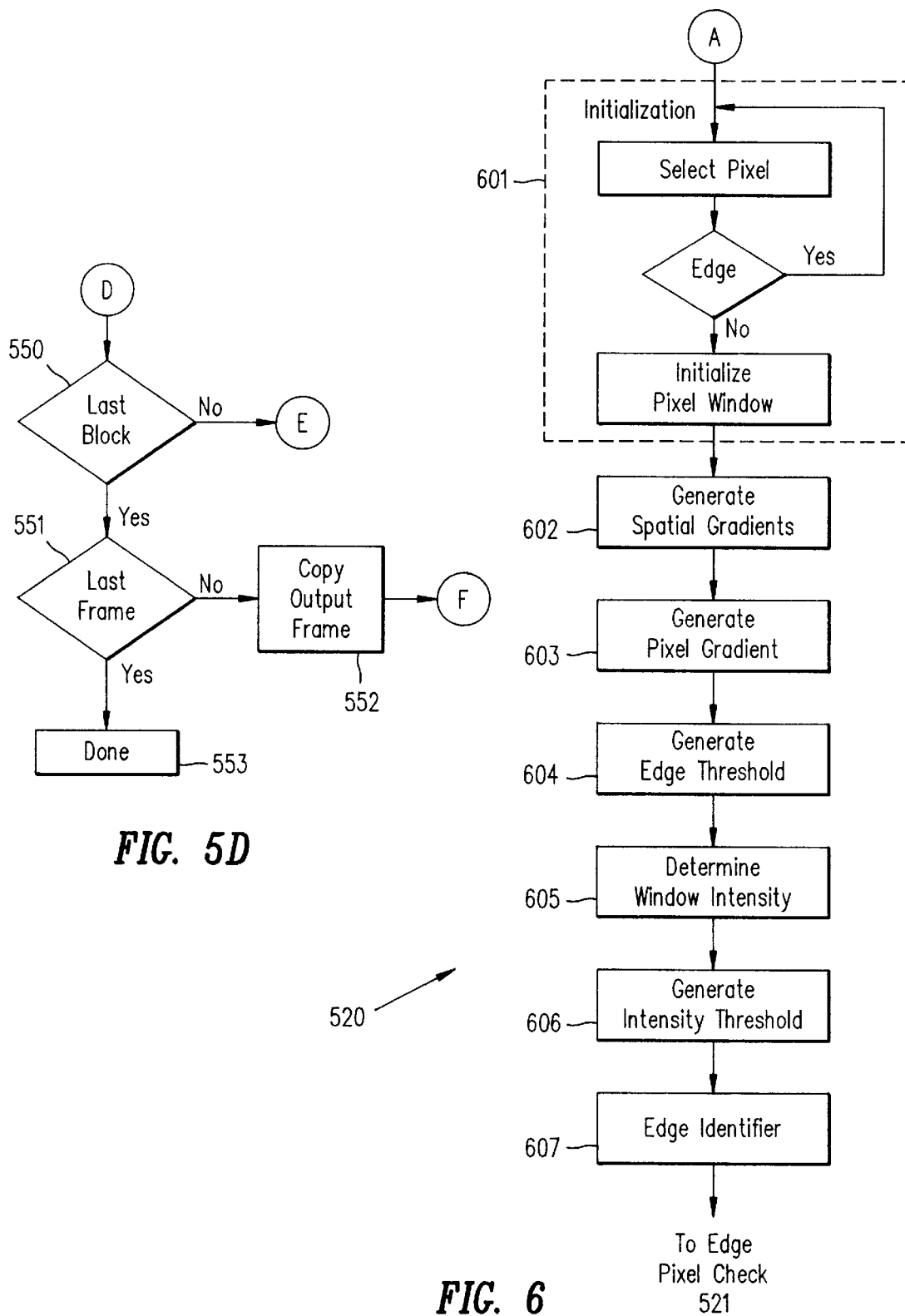
FIG. 5D is a continuation of the process flow diagram of FIGS. 5A, 5B, and 5C.
FIG. 6 is a more detailed process diagram of the operations in the edge detector of FIG. 5B.

In copy current block 538, the digitally noise reduced current sixteen-by-sixteen pixel block in in-block memory 420 is copied to output frame memory 440. When the copy is complete, copy current block 538 transfers to last block check 550 (FIG. 5D). This is illustrated in FIG. 4 by switch element 415, which is positioned to form a closed path from in-block memory 420 to output frame memory 440.

FIG. 5C also illustrates one embodiment of the process in switched filter unit 330. Upon entry of switched filter unit 330, switch element 415 connects switched filter unit 330 to in-block memory 420. Switched filter unit 330 processes each of the pixels in the current block pixel by pixel.

In switched filter unit 330, each pixel is first classified as one of an edge pixel, a edge boundary pixel, and a shade pixel. Specifically, edge pixel check 541 determines whether the current pixel was classified as an edge pixel. If the current pixel is an edge pixel, no filtering is done and so check 541 transfers to last pixel check 547. If the current pixel is not an edge pixel, check 541 transfers to classify pixel process 542.

In classify pixel process 542, the current pixel is processed to determine whether the current pixel is one of an edge boundary pixel, and a shade pixel. As explained more completely below, the edge flag information in edge-block memory 430 for a three-by-three pixel window about the current pixel is used by classify pixel process 542. After the current pixel is classified, processing transfers to a filter unit 549 within switched filter unit 330.

In shade pixel check 543, if the current pixel is a shade pixel, processing transfers to two-dimensional filter 544, and otherwise to edge boundary pixel check 545. In two-dimensional filter 544, the current pixel in in-block memory 420 is replaced by the output pixel of a two-dimensional filter, as described more completely below. Two-dimensional filter 544, upon replacement of the current pixel, transfers processing to last pixel check 547.

In edge boundary pixel check 545, if the current pixel is an edge boundary pixel, processing transfers to one-dimensional filter 546, and otherwise to last pixel check 547. In one-dimensional filter 546, the current pixel in in-block memory 420 is replaced by the output pixel of an appropriate one-dimensional directional filter, as described more completely below. One-dimensional filter 546, upon replacement of the current pixel, transfers processing to last pixel check 547.

Last pixel check 547 determines whether all the pixels in the current block have been processed by switched filter unit 330. If a pixel or pixels remain for processing, last pixel check 547 returns to edge pixel check 541 and processes 541 to 547 are repeated for the next pixel in the block.

When all the pixels in the current block have been processed, last pixel check 547 transfers to copy current block 548. Copy current block 548 repositions switch element 415 so that digitally noise reduced and artifact reduced sixteen-by-sixteen pixel block in in-block memory 420 is copied to output frame memory 440. Upon completion of the copy, copy current block 548 transfers to last block check 550.

Upon entry to last block check 550, the post-processing of the current block is complete. Thus, last block check 550 determines whether there is an additional block in the frame in input frame memory 410 that remains to be post-processed. If there is at least one additional block in memory 410, last block check 550 transfers to load block process 503 (FIG. 5A) and the next block is processed as described above in references to FIG. 5A to 5C. If there are no additional blocks in memory 410 that require processing, the post-processing of the current frame is complete and so processing transfers to last frame check 551.

Last frame check 551 determines whether there is an additional frame in the current sequence of frames that remains to be post-processed. If there is at least one additional frame in the sequence, last frame check 551 transfers to copy output frame process 552, which in turn copies the post-processed frame in output frame memory 440 to frame memory 301. Upon completion of the copy, process 552 transfers to initialize frame process 502 (FIG. 5A) and the next frame is processed as described above in references to FIG. 5A to 5C. If there are no additional frames that require processing, the post-processing of the current sequence is complete and so processing transfers to done 553.

The performance of post-processor 300 on data from codecs operating at 128 kbps has shown a significant reduction in artifacts and mosquito noise. Several standard CIF test sequences were coded at 96 kbps. One hundred fifty frames from each test sequence were coded and post-processed. The post-processed frames were then interpolated to CCIR 601 resolution and displayed side-by-side.

Substantial improvements were seen in all the test sequences. The combination of digital noise reduction and artifact reduction showed that mosquitoes were distinctly reduced around moving edges compared with use of artifact reduction only. Furthermore, textured stationary areas in the background were not post-processed. Overall post-processor 300 provides a substantial improvement in the quality of coded sequences with a perceptual effect judged as equivalent to almost doubling the line rate. Improvements over artifact reduction alone are obtained by incorporating previous frame memory. Therefore, temporal information in the coded sequences is used to improve performance.

In edge detector 520, each block is processed by a set of linear or nonlinear spatial operators which measure luminance changes along different directions, i.e., a plurality of spatial gradients are generated, for each pixel. The plurality of spatial gradients are combined to obtain a gradient map. If the gradient map of a pixel is sufficiently large, the pixel is classified as an edge pixel otherwise the pixel is classified as a not edge pixel.

FIG. 6 is a process diagram that illustrates one embodiment of the process edge detector 520 uses for each pixel in a block to determine whether the pixel lies on an edge in the image contained in the current frame. Specifically, each pixel, Q(i,j), where index i identifies the row and index j identifies the column written in in-block memory 420. In the embodiment, indices i and j range from one to eighteen because, as explained above, an edge characterization is required for a one pixel border about the current sixteen-by-sixteen pixel block. The pixels in a three-by-three window 700 about pixel Q(i,j) are shown in FIG. 7.

In initialization process 601, pixel Q(i,j) is selected where indices i and j initially point to the first pixel, that is not a replicated pixel within eighteen-by-eighteen pixel block centered in in-block memory 420 and the three-by-three window of pixels. Specifically, in this embodiment, indices are set to address the appropriate location within in-block memory 420. Recall that for each replicated pixel, load block process 503 sets the edge flag in edge-block memory 430 and so it is not necessary for edge detector 520 to process these pixels. Upon each subsequent entry to initialization process 601, the next pixel in raster scan order is selected. Upon completion of initialization process 601, edge detector 520 transfers processing to generate spatial gradients process 602.

In this embodiment, differential operators are utilized within generate spatial gradients process 602 to obtain a plurality of spatial luminance gradients Gk(i,j), where index k represents a particular edge orientation within three-by-three pixel window 700. Specifically, these differential operators perform discrete differentiation on the pixels in three-by-three pixel window 700 to measure the luminance change along different directions.

Specifically, a plurality of differential operators Hk(i,j) are based on Sobel differential operators. The Sobel differential operators used are given in expression (3).

$$H1 = \begin{bmatrix} 1 & 0 & -1 \\ 2 & 0 & -2 \\ 1 & 0 & -1 \end{bmatrix} \quad (3)$$

$$H2 = \begin{bmatrix} 1 & 2 & 1 \\ 0 & 0 & 0 \\ -1 & -2 & -1 \end{bmatrix}$$

$$H3 = \begin{bmatrix} 2 & 1 & 0 \\ 1 & 0 & -1 \\ 0 & -1 & -2 \end{bmatrix}$$

$$H4 = \begin{bmatrix} 0 & 1 & 2 \\ -1 & 0 & 1 \\ -2 & -1 & 0 \end{bmatrix}$$

Operators H1(i,j) and H2(i,j) measure the magnitude of horizontal gradient, i.e., a vertical edge 801 (FIG. 8A), and the vertical gradient, i.e., a horizontal edge 802 (FIG. 8B), respectively whereas operators H3(i,j) and H4(i,j) measure the diagonal gradients, i.e, diagonal edges 803 and 804 illustrated in FIGS. 8C and 8D, respectively.

Thus, this plurality of operators measure all possible combinations of edges through three-by-three window 700. Hence, in this embodiment of generate spatial gradients process 602, operators Hk(i,j), where k takes on values of one to four, sometimes referred to as masks Hk(i,j), are applied to current pixel Q(i,j) to generate four spatial gradients Gk(i,j) 15 for current pixel Q(,j). After the spatial gradients are generated, processing transfers from process 602 to generate pixel gradient process 603.

In generate pixel gradient process 603, a point wise operator combines the plurality of spatial gradients to obtain a pixel gradient A(i,j) for pixel Q(i,j). However, in the embodiment, the magnitude of pixel gradient A(i,j) is of interest, and so either the squared sum or the absolute sum of the plurality of spatial gradients can be used. Thus, the absolute sum of the plurality of spatial gradients is taken as the point operator. Therefore, pixel gradient A(i,j) is:

$$A(i,j) = \frac{1}{16} \left[ |G1(i,j)| + |G2(i,j)| + |G3(i,j)| + |G4(i,j)| \right] \quad (4)$$

where 1/16 is used for normalization. Upon completion of generate pixel gradient process 603, processing transfers to generate texture threshold process 604.

In generate texture threshold process. 604, two different processes can be used to generate the threshold that is used to determine whether the pixel is an edge pixel. The first process is to simply set the threshold to a fixed sufficiently large value. The second process utilizes an adaptive edge threshold process. In this embodiment, generate texture threshold process 604 utilizes an adaptive edge threshold process.

Specifically, the first operation in this embodiment of generate texture threshold process 604 is to generate a plurality of edge estimators that in this embodiment are pixel texture estimators Tk(i,j) where k takes on values from one to four. A pixel texture estimator is generated for each of the possible edges through three-by-three window 700. Each pixel texture estimator is generated by adding absolute values of pairwise differences of pixels lying on either side of an edge for the four distinct edges. The various pixels in three-by-three window 700 are weighted with the same weights as in the corresponding operator used to generate the spatial gradient, i.e, the weights given in expression (3). weighting based on the Sobel operators has been widely tested and reported in the literature as providing good performance. This weighting was empirically tested and demonstrated to provide good performance.

For clarity, each of the pixel texture estimators are generated as follows. Pixel texture estimator T1(i,j), which corresponds to the vertical edge detected by Sobel operator H1, is:

$$T1(i,j)=|Q(i-1,j-1)-Q(i-1,j+1)|+|2Q(i,j-1)-2Q(i,j+1)|+|Q(i+1,j-1)-Q(i+1,j+1)|$$

If a vertical edge is present through pixel Q(i,j), the magnitude of spatial gradient G1(i,j) is the same as pixel texture estimator T1(i,j).

Pixel texture estimator T1(i,j), which corresponds to the horizontal edge detected by Sobel operator H2, is:

$$T2(i,j)=|Q(i-1,j-1)-Q(i+1,j-1)|+2|Q(i-1,j)-Q(i+1,j)|+|Q(i-1,j+1)-Q(i+1,j+1)|$$

If a horizontal edge is present through pixel Q(i,j), the magnitude of spatial gradient G2(i,j) is the same as pixel texture estimator T2(i,j).

Pixel texture estimator T3(i,j), which corresponds to the forty-five degree diagonal edge detected by Sobel operator H3, is:

$$T3(i,j)=|Q(i,j-1)-Q(i+1,j)|+2|Q(i-1,j-1)-Q(i+1,j+1)|+|Q(i-1,j)-Q(i,j+1)|$$

If a forty-five degree diagonal edge is present through pixel Q(i,j), the magnitude of spatial gradient G3(i,j) is the same as pixel texture estimator T3(i,j).

Pixel texture estimator T4(i,j), which corresponds to the one hundred and thirty-five degree diagonal edge detected by Sobel operator H4, is:

$$T4(i,j)=|Q(i-1,j)-Q(i,j-1)|+2|Q(i-1,j+1)-Q(i+1,j-1)|+|Q(i,j+1)-Q(i+1,j)|$$

If a 135° diagonal edge is present through pixel Q(i,j), the magnitude of spatial gradient G4(i,j) is the same as pixel texture estimator T4(i,j).

After each of the plurality of pixel texture estimators are generated, generate texture threshold process 604 uses the pixel texture estimators to generate an adaptive texture threshold TEXTHRS(i,j). In this embodiment, adaptive texture threshold TEXTHRS(i,j) is a fraction of the sum of pixel texture estimators T1(i,j), T2(i,j) T3(i,j), and T4(i,j). Specifically, $$TEXTHRS(i,j)=(t/16)*(T1(i,j)+T2(i,j)+T3(i,j)+T4(i,j))$$

where 1/16 is a normalization factor, and threshold adjustment factor t is determined as described below.

Transform coded images at low data rates show blocking artifacts. Since block boundaries are low-level edges, care is taken to ensure that edge detector 520 does not classify blocking artifacts as edges. In one embodiment of edge detector 520, variable thresholding is utilized. Specifically, a larger adaptive texture threshold TEXTHRS(i,j) is used for classification of pixels along block boundaries, because the blocking artifacts result in block boundaries typically having higher spatial gradients. Hence, in this embodiment, a first threshold adjustment factor t1 is used for pixels on block boundaries, and a second threshold adjustment factor t2 is used for all pixels other than those on block boundaries. First threshold adjustment factor t1 is greater than second threshold adjustment factor t2.

The particular levels selected for first threshold adjustment factor t1 and second threshold adjustment factor t2 were selected empirically. A representative set of images is processed with various levels of these thresholds. The particular levels selected are those which provide performance consistent with observations made by human observers. The level selected for first threshold adjustment factor t1 ensures that pixels on block boundaries in smooth areas are not classified as textured whereas the level selected for second threshold adjustment factor t2 ensures that pixels in textured areas are classified as textured.

Alternatively, generate pixel gradient process 603 can be modified to mitigate the effects of artificial gradients along block boundaries. The blocking artifacts associated with block boundaries contribute primarily to gradients associated with either a horizontal edge or a vertical edge depending on whether the block boundary is horizontal or vertical. Thus, in generate pixel gradient process 603, the effect of blocking artifacts is mitigated by ignoring the artificial gradients induced by blocking artifacts in generating pixel gradient A(i,j) and adaptive texture threshold TEXTHRS(i, j).

For example, spatial gradient G1(i,j) generated by Sobel operator H1to detect a vertical edge is discarded in generation of pixel gradient A(i,j) along the vertical block boundaries. Similarly spatial gradient G2(i,j) generated by Sobel operator H2 to detect a horizontal edge is discarded in generation of pixel gradient A(i,j) along the horizontal block boundaries. Consequently, the normalization factor used in pixel gradient A(i,j) and adaptive texture threshold TEXTHRS(i,j) is 1/12. At block corners where artificial horizontal as well as vertical gradients are present, the variable adaptive texture threshold, described above, is used. Upon completion of generate texture threshold process 604, processing transfers to window intensity process 605.

In window intensity process 605, a background luma S(i,j) is estimated using the intensity of the pixels in three-by-three window 700 surrounding current pixel Q(i,j). The background luma is generated because the perceived contrast of an object by the human eye depends on the luminance of the background. This characteristic of the human visual systems (HVS) has been documented in Weber's law. See, for example, A. K. Jain, *Fundamentals of Digital Image Processing*, Prentice Hall, N.J., 1989. The difficulty of discerning edges increases with an increase in the average luminance of the background. Thus, luminance masking is utilized by edge detector 520.

In this embodiment, background luma S(i,j) is generated by summing the luminance for each pixel in the 3×3 window and dividing by nine. This weighting is used to generate background luma S(i,j) to provide a measure of the average luminance in the 3×3 window. Also, this measure can be used directly in Weber's law Upon generation of background luma S(i,j), processing transfers from window intensity process 605 to generate intensity threshold process 606. In intensity threshold process 606, luminance threshold B(i,j) is generated that is proportional to background luma S(i,j). In this embodiment, luminance threshold B(i,j) is defined as:

$$B(i,j) = max(Bmin, p*s(i,j))$$

where p=luminance threshold adjustment factor; and
Bmin =minimum luminance threshold.

Minimum luminance threshold Bmin is used to eliminate spurious edges, which are areas where the luminance contrast is too low for the human eye to perceive an edge. The level of minimum luminance threshold Bmin is empirically selected to prevent such areas from qualifying as edges. Luminance threshold adjustment factor p is empirically selected such that pixels which are perceived as edges by the human eye are appropriately classified. In this embodiment, minimum luminance threshold Bmin is taken as sixteen and luminance threshold adjustment factor p is taken as 0.20. Upon completion of generate intensity threshold process 606, processing transfers to edge identifier step 607.

In edge identifier step 607, current pixel Q (i,j) is identified as an edge pixel if pixel gradient A(i,j) exceeds both adaptive texture threshold TEXTHRS(i,j) and luminance threshold B(i,j) and otherwise as not an edge pixel. This completes the operation of edge detector 520 in this embodiment.

Each pixel in the 18×18 block is processed by edge detector 520 as indicated in FIG. 6. However, the specific operations within a particular process of edge detector 520 can be modified to accommodate factors such as timing constraints, coding data rates, processing power, texture and significance of artifacts, for example.

Specifically, since the complexity of edge detection is an important criterion in real-time implementations, in one embodiment, the process performed by edge detector 520 was a simplified version of the process given above, that is referred to herein as a simplified edge detector 520A.

Specifically, with simplified edge detector 520A, in generate spatial gradients process 602, only Sobel operators H1 and H2 (See expression (3)) were used to generate vertical spatial gradient G1(i,j) and horizontal spatial gradients G2(i, j) in place of all four Sobel operators. The use of only the vertical and horizontal spatial gradients required corresponding changes in each of the subsequent processes.

Specifically, in generate pixel gradient process 603, pixel gradient A(i,j) is defined as:

$$A(i,j) = (\frac{1}{8})*(|G1(i,j)| + |G2(i,j)|).$$

where (⅛) is a normalization factor.

In generate texture threshold process 604, only pixel texture estimators T1(i,j) and T2(i,j) are generated as described above. Thus, in this embodiment, adaptive texture threshold TEXTHRS(i,j) is:

$$TEXTHRS(i,j) = (t/8)*(T1(i,j) + T2(i,j))$$

where threshold adjustment factor t is taken as first threshold adjustment factor t1 and second threshold adjustment factor t2. First threshold adjustment factor t1 is used for pixels on block boundaries and is taken as 0.90. Second threshold adjustment factor t2 is used for all pixels other than those on block boundaries and is taken as 0.80. The remaining processes in edge detector 520A are the same as those described above.

When tested on sequences, this simplified edge detector generated accurate edge maps identifying areas which would be classified as edges by the human eye. Nevertheless, the above embodiment of simplified edge detector 520A is only one of many embodiments available for edge detection unit 320. Simplifications and modifications to edge detection unit 320 can be made for specific system requirements. Such simplifications could include replacement of adaptive texture threshold TEXTHRS(i,j) by a fixed threshold and elimination of luminance masking through eliminating the test with luminance threshold B(i,j).

When a block has been processed by edge detection unit 320, an edge map is stored for the current block and the one pixel boundary around the current block in edge-block memory 430. The edge map, as described above, is a plurality of edge flags where for each pixel, the edge flag is set if the pixel is on an edge and is cleared if the pixel is not on an edge. In this embodiment, switched filter unit 330 uses the edge map without further processing.

Specifically, switched filter unit 330 determines the filtering applied to each pixel by examining the edge map for pixels within a three-by-three window surrounding the current pixel. As explained above, a pixel is classified as either from an edge, boundary or "shade" (smooth) area. Pixels along edges are left unchanged. Pixels along edge boundaries are directionally filtered with a one-dimensional filter, and shade pixels are low pass filtered with a two-dimensional filter.

Typically, in prior art post-processing systems, edge detection units follow thresholding by edge connectivity tests and edge linking to obtain the edge map. These are complex operations. Pixel classification using only the edge map within a three-by-three window has significantly less complexity by linking and coalescing nearby disjoint edge segments for the post-processing. The results are similar to the results obtained using the more complex operations.

Figure 9:
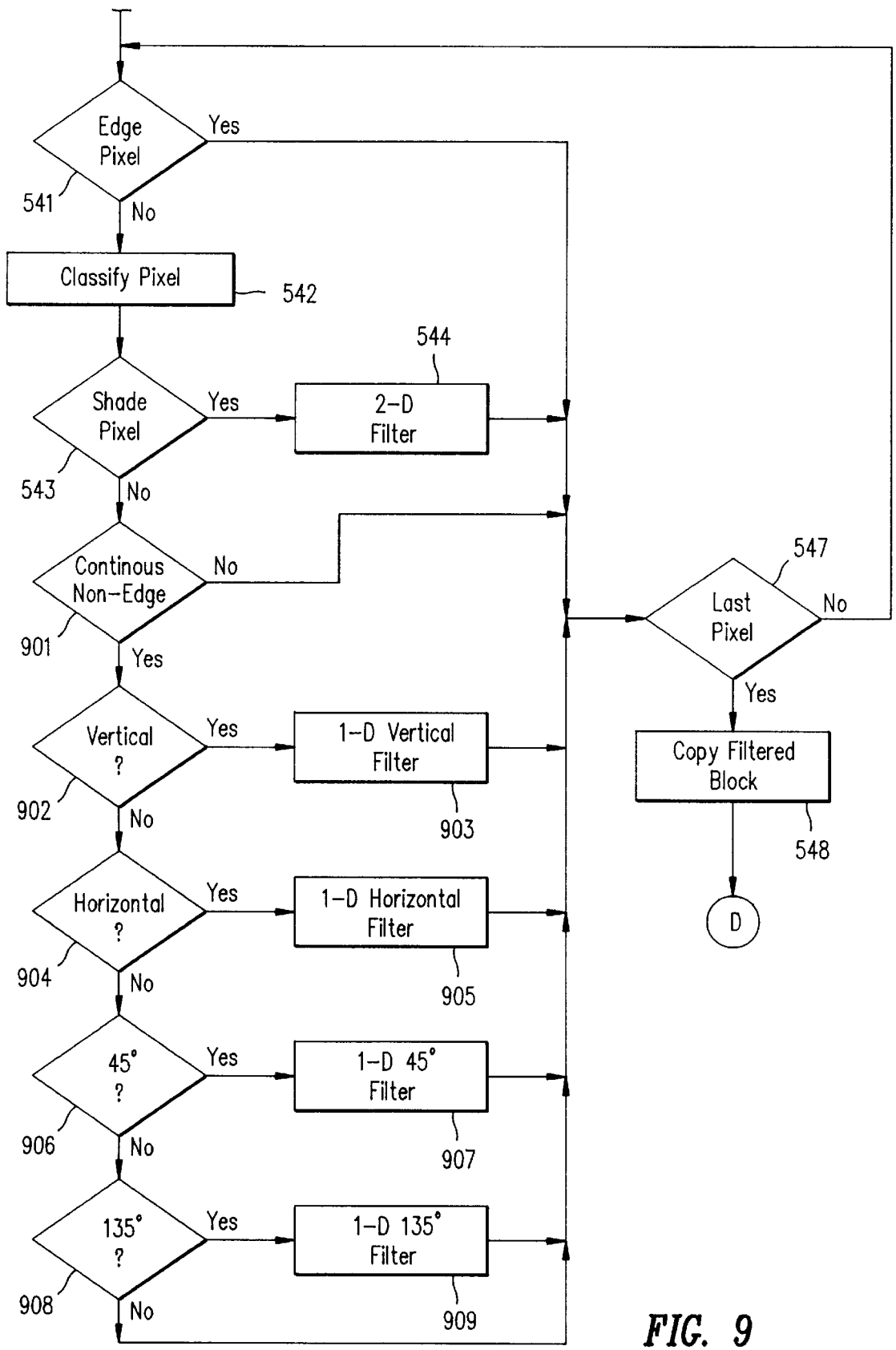
FIG. 9 is a more detailed process flow diagram of the switched filter unit of this invention.

FIG. 9 is one embodiment of a more detailed process performed by switched filter unit 330. As explained above, each pixel in the current block is individually processed in switched filter unit 330.

Initially, edge pixel check 541 determines whether the edge flag is set for the current pixel. As explained above, if the edge flag is set, the current pixel is on an edge in the image and to maintain the sharpness of the edges, edge pixels are not filtered. Thus, if the edge flag is set for the current pixel, processing transfers from edge pixel check 541 to last pixel check 547 and otherwise to classify pixel process 542.

Classify pixel process 542 analyzes the edge map for a three-by-three pixel window about the current pixel. A filter control flag is set equal to the number of pixels in the three-by-three pixel window including the current pixel that do not have the edge flag set. In this embodiment, the filter control flag ranges from one to nine. Upon completion of classify pixel process 542, processing in switched filter unit 330 transfers to shade pixel check 543.

Shade pixel check 543 transfers processing to two-dimensional filter process 544 if the filter control flag is nine, i.e., if none of the pixels in the three-by-three window have the edge flag set so that, the current pixel is a shade pixel. Ensuring that all pixels in the three-by-three pixel window are not edge pixels implies that all pixels processed by two-dimensional filter process 544 are on the same side of an edge and do not span an edge. Therefore, edges are not smeared by two-dimensional filter process 544. If the filter control flag is less than nine, shade pixel check 543 transfers processing to continuous edge check 901, that is described more completely below.

In this embodiment, two-dimensional filter process 544 utilizes a two-dimensional low pass filter. The low pass filter is a separable three-tap low pass filter (LPF) in each direction with a mask of the form:

$$\begin{bmatrix} \frac{1}{16} & \frac{1}{8} & \frac{1}{16} \\ \frac{1}{8} & \frac{1}{4} & \frac{1}{8} \\ \frac{1}{16} & \frac{1}{8} & \frac{1}{16} \end{bmatrix}$$

Two-dimensional filter process 544 removes the mosquito noise and the blocking artifacts in image areas at a distance greater than or equal to one pixel horizontally and vertically from edge pixels. The current pixel is replaced by the output signal from the two-dimensional filter, as explained above, and processing transfers to last pixel check 547.

Recall that if the filter control flag is less than nine, shade pixel check 543 transfers processing to continuous non-edge check 901. Continuous non-edge check 901 determines whether enough non-edge pixels are present in the three-by-three window including the current pixel to perform further directional-filtering without filtering an edge pixel. Specifically, if at least three of the pixels are non-edge pixels, a continuous line of non-edge pixels may exist through the window. However, if less than three of the pixels in the current window are not-edge pixels, any one-dimensional filter along any possible axis through the current window would include an edge pixel. Consequently, if the filter control flag is less than three, continuous non-edge check 901 transfers processing to last pixel check 547 and otherwise to vertical line of non-edge pixels check 902.

Figure 10A:
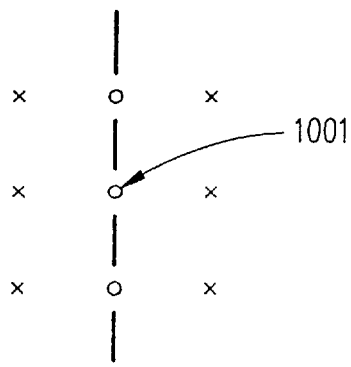
FIG. 10 illustrates the various conditions that are checked in the switched filter unit of this invention.

Vertical line of non-edge pixels check 902 determines whether the current window includes a vertical line of non-edge pixels through the current pixel. Specifically, FIG. 10A illustrates the current window configuration in the edge pixel map that is detected by vertical line of non-edge pixels check 902. If the pixel immediately above current pixel 1001, the pixel immediately below current pixel 1001 are non-edge pixels, vertical line of non-edge pixels check 902 is true and otherwise false.

In FIGS. 10A to 10D, a non-edge pixel is represented by a zero to indicate that the edge flag is not set for that pixel. Pixels that are not on the vertical axis through current pixel are represented by an "x", because the state of the edge flag for these pixels is a don't care state. If vertical line of non-edge pixels check 902 is true, processing transfers to one-dimensional vertical filter process 903 and otherwise to horizontal line of non-edge pixels check 904.

In one-dimensional vertical filter process 903, the vertical line of non-edge pixels in the current window is filtered by a three-tap filter. In this embodiment, the three pixels are processed by a filter of the form [¼, ½, ¼] and the filter output signal replaces the current pixel. Upon completion of the filtering process, one-dimensional vertical filter process transfers 903 to last pixel check 547.

Figure 10B:
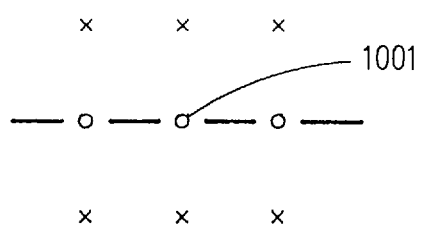

Horizontal line of non-edge pixels check 904 determines whether the current window includes a horizontal line of non-edge pixels through the current pixel. Specifically, FIG. 10B illustrates the current window configuration in the edge pixel map that is detected by horizontal line of non-edge pixels check 904. If the pixel immediately to the left of current pixel 1001, the pixel immediately to the right of current pixel 1001 are non-edge pixels, horizontal line of non-edge pixels check is true and otherwise false. If horizontal line of non-edge pixels check 904 is true, processing transfers to one-dimensional horizontal filter process 905 and otherwise to forty-five degree line of non-edge pixels check 906.

In one-dimensional horizontal filter process 905, the horizontal line of non-edge pixels in the current window are filtered by a three-tap filter. In this embodiment, the three pixels are processed by a filter of the form [¼, ½, ¼] and the filter output signal replaces the current pixel. Upon completion of the filtering process, one-dimensional horizontal filter process transfers to last pixel check 547.

Figure 10C:
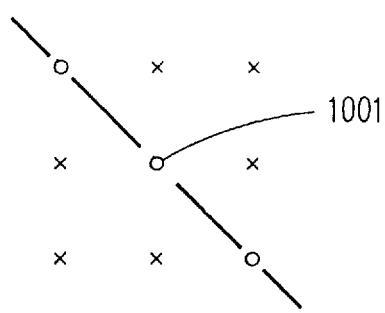

Forty-five degree line of non-edge pixels check determines whether the current window includes a forty-five degree line of non-edge pixels through current pixel 1001. Specifically, FIG. 10C illustrates the current window configuration in the edge pixel map that is detected by forty-five degree line of non-edge pixels check. If the pixel diagonally above and to the left of current pixel 1001 and pixel diagonally below and to the right of current pixel 1001 are non-edge pixels, forty-five degree line of non-edge pixels check 906 is true and otherwise false. If forty-five degree line of non-edge pixels check 906 is true, processing transfers to one-dimensional forty-five degree filter process 907 and otherwise to one hundred thirty-five degree line of non-edge pixels check 908.

In one-dimensional forty-five degree filter process 907, the forty-five degree line of non-edge pixels in the current window are filtered by a three-tap filter. In this embodiment, the three pixels are processed by a filter of the form [¼, ½, ¼] and the filter output signal replaces the current pixel. Upon completion of the filtering process, one-dimensional forty-five degree filter 907 process transfers to last pixel check 547.

Figure 10D:
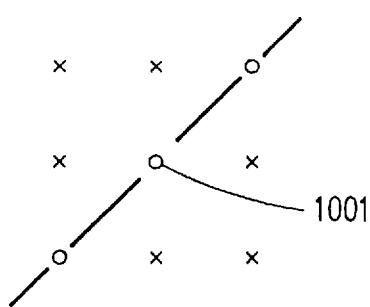

One hundred thirty-five degree line of non-edge pixels check 908 determines whether the current window includes a one hundred thirty-five degree line of non-edge pixels through current pixel 100. Specifically, FIG. 10D illustrates the current window configuration in the edge pixel map that is detected by one hundred thirty-five degree line of non-edge pixels check 908. If the pixel diagonally below and to the left of current pixel 1001 and the pixel diagonally above and to the right of current pixel 1001 are non-edge pixels, one hundred thirty-five degree line of non-edge pixels check 908 is true and otherwise false. If one hundred thirty-five degree line of non-edge pixels check 908 is true, processing transfers to one-dimensional one hundred thirty-five degree filter 904 process and otherwise to last pixel check 547.

In one-dimensional one hundred thirty-five degree filter process 909, the one hundred thirty-five degree line of non-edge pixels in the current window are filtered by a three-tap filter. In this embodiment, the three pixels are processed by a filter of the form [¼, ½, ¼] and the filter output signal replaces the current pixel. Upon completion of the filtering process, one-dimensional one hundred thirty-five degree filter process 904 transfers to last pixel check 547.

Last pixel check 547 determines whether all the pixels in the current block have been processed by switched filter unit 330. If one or more pixels remain for processing, last pixel check 547 transfers to edge pixel check 541 and otherwise to copy current block process 548 that was described above.

Thus, in this embodiment of switched filter unit 330 pixels directly adjacent to edges are not processed with the two-dimensional filter because such a filter would include pixels from either sides of an edge. However, it is desirable to clean up the area next to edges (edge border areas) to the maximum extent possible without smearing the edges since this results in clean sharp edges which are critical to the perceived quality of an image. Thus, as explained above if at least three pixels in the window including the current pixel are not edge pixels, the window is examined to see if all the pixels lying along one of the four possible axes through the window are not edge pixels. If an axis is made-up of non-edge pixels, the pixels on that axis are processed with a one-dimensional filter.

Notice that the four possible axes are checked sequentially and the directional filtering is performed along the first axis along which all the pixels are not-edge pixels. Axis examination is stopped after the first axis along which filtering is allowed is found. Although adjacent pixels are not examined for continuity of direction, axis examination always proceeds in the order shown above. This ensures that adjacent pixels are classified similarly if ambiguity in classification exists.

This process of axis selection and resultant one-dimensional directional filtering is equivalent to finding pixels adjacent to the edges, i.e, finding edge border areas, and filtering pixels in the edge border areas along a direction parallel to the edges. This technique also provides edge enhancement.

Edge pixels and pixels directly adjacent to the edge pixels that are not selected for one-dimensional directional filtering are not post-processed. Leaving these pixels unchanged ensures that sharpness of edges in the decoded image is not degraded by post-processing. This implies that the pixels adjacent to edges which do not qualify for one-dimensional directional filtering are also treated like edges. This is equivalent to coalescing edge segments with a small discontinuity (1 to 2 pixels) into continuous contours. Therefore, the pixel classification process in switched filter unit 330 compensates for the lack of edge linking and tracing and allows post-processor 300 to effectively use an edge map equivalent to those generated by more complex edge detectors.

At low data rates, chroma components show severe blocking. When edge-detector 520 is applied to the chroma components, no edges are detected since the coded chroma has no distinct edges. In the absence of edges, all pixels appear as shade pixels and so post-processor 300 reduces to a two-dimensional low pass filter.

Some improvement in chroma noise is observed by low pass filtering the chroma with the two-dimensional low pass filter. Specifically, the filter mask is:

$$\begin{bmatrix} \frac{1}{16} & \frac{1}{8} & \frac{1}{16} \\ \frac{1}{8} & \frac{1}{4} & \frac{1}{8} \\ \frac{1}{16} & \frac{1}{8} & \frac{1}{16} \end{bmatrix}$$

Both chroma components are low pass filtered with this filter. The improvement in chroma noise is more pronounced for a coded video rate of 96 kbps as opposed to 56 or 48 kbps.

Since the improvement is minimal for the lower video rates, the complexity of post-processor 300 can be reduced by only processing the luminance component. This choice is reasonable since at low to moderate data rates, luma variations mask the chroma artifacts.

Artifact reduction unit 350 was used by itself on a variety of test sequences that included sequences at QCIF resolution and sequences generated at QCTX resolution. The QCIF format is a standard format employed in international standards such as H.261 and H.234. The QCTX format is a proprietary format employed in the AT&T 2500 videophone. The QCTX sequences were coded using a PV2 video coder, that is the same video coder as in AT&T 2500 videophone, at data rates ranging from 10 to 20 kbps. The QCIF sequences were coded using a H.261 coder at data rates ranging from 48 to 112 kbps. Maximum frame rate was set to 10 frames per second. All of these sequences are suitable for personal video communications. In order to ensure that artifact reduction unit 350 does not introduce any degradations in more complex sequences, artifact reduction unit 350 was applied to a mobile sequence at CIF resolution coded open loop with a fixed normalization factor of 32 at 10 frames per second with a H.261 coder.

Artifact reduction unit 350 was successful in eliminating most of the coding artifacts while preserving edges. The visual improvement in the quality of low to medium bit rate coded images was striking.

These extensive simulations show that the artifact reduction unit 350 substantially and dramatically improves the performance of low to medium bit rate video codecs by cleaning coding artifacts while preserving edge sharpness. The post-processor 300 presented is independent of the encoder. Therefore post-processor 300 can be added to any video receiver between decoder and display modules to enhance the displayed image.

In one embodiment of this invention, the various processes described herein are written in the C++computer language and are compiled and linked using the CenterLine CC compiler to obtain binary code that can be stored in a non-volatile memory of a decoder. In one embodiment, the binary code was used with a simulated decoder and the output images from postprocessor 300 were stored and subsequently displayed using video players.

In view of this disclosure the various units described herein can be implemented in either software or hardware or a combination of the two to achieve a desired performance level. Therefore, the embodiments described herein are illustrative of the principles of this invention and are not intended to limit the invention to the specific embodiments described. In view of this disclosure, those skilled in the art can implement the combination of a digital noise reduction unit and an artifact reduction unit in a wide variety of ways. Further, the artifact reduction unit can be used independent of digital noise reduction.

We claim:

1. A transform artifact reduction method for decoded video pixel data, said method comprising:

digitally noise reducing a block of pixels to obtain a digitally noise reduced block of pixels; and filtering said digitally noise reduced block of pixels using a spatially-variant filter wherein said filtering further comprises adaptively identifying each pixel in said digitally noise reduced block of pixels as one of an edge pixel and a non-edge pixel;

assigning a pixel in said digitally noise reduced block of pixels one classification in a plurality of edge classifications using said edge pixel and said non-edge pixel identifications for pixels in a window about said pixel, said assigning said pixel in said digitally noise reduced block of pixels one classification in said plurality of edge classifications using said edge pixel and said non-edge pixel classifications for pixels in a window about said pixel further comprising generating an edge map for said digitally noise reduced block of pixels wherein in said edge map, an edge flag for each pixel in said digitally noise reduced block of pixels is configured to identify each pixel as one of said edge pixel and said non-edge pixel; and adaptively filtering each pixel in said digitally noise reduced block of pixels based upon said assigned classification to reduce transform artifacts in a video image.

2. A transform artifact reduction method for decoded video pixel data as in claim 1 wherein said generating said edge map further comprises:

comparing a pixel gradient for a pixel with a threshold; and setting said edge flag for said pixel in said edge map upon said pixel gradient being greater than said threshold.

3. A transform artifact reduction method for decoded video pixel data as in claim 2 wherein said comparing a pixel gradient for said pixel further comprises:

comparing said pixel gradient with an adaptive edge threshold.

4. A transform artifact reduction method for decoded video pixel data as in claim 3 wherein said adaptive edge threshold is an adaptive texture threshold.

5. A transform artifact reduction method for decoded video pixel data as in claim 2 wherein said comparing said pixel gradient for said pixel further comprises:

comparing said pixel gradient with a luminance threshold.

6. A transform artifact reduction method for decoded video pixel data as in claim 2 wherein said comparing said pixel gradient for said pixel further comprises:

comparing said pixel gradient with both an adaptive edge threshold, and a luminance threshold.

7. A transform artifact reduction method for decoded video pixel data as in claim 6 wherein said setting said edge flag for said pixel in said edge map upon said pixel gradient being greater than said threshold further comprises:

setting said edge flag only upon said pixel gradient being greater than said adaptive edge threshold, and being greater than said luminance threshold.

8. A transform artifact reduction method for decoded video pixel data as in claim 6 further comprising prior to said comparing said pixel gradient:

generating said luminance threshold.

9. A transform artifact reduction method for decoded video pixel data as in claim 8 wherein said generating said luminance threshold further comprises:

generating a background luminance measure for said pixel wherein said luminance threshold is proportional to said background luminance measure.

10. A transform artifact reduction method for decoded video pixel data as in claim 9 wherein said generating said background luminance measure for said pixel further comprises:

averaging luminance components in a window about said pixel.

11. A transform artifact reduction method for decoded video pixel data as in claim 10 wherein said window is a three-by-three pixel window with said pixel centered in said three-by-three pixel window.

12. A transform artifact reduction method for decoded video pixel data as in claim 9 wherein said generating said luminance threshold further comprises:

adjusting said background luminance measure to obtain an adjusted background luminance measure.

13. A transform artifact reduction method for decoded video pixel data as in claim 12 wherein said generating said luminance threshold further comprises:

defining said luminance threshold as the maximum of a minimum luminance threshold and said adjusted luminance background measure.

14. transform artifact reduction method for decoded video pixel data as in claim 3 further comprising prior to said comparing said pixel gradient with said adaptive edge threshold:

generating said pixel gradient for said pixel.

15. A transform artifact reduction method for decoded video pixel data as in claim 14 wherein said generating said pixel gradient further comprises:

generating a plurality of spatial gradients for said pixel using pixels in a window about said pixel.

16. A transform artifact reduction method for decoded video pixel data as in claim 15 wherein said window is a three-by three pixel window with said pixel centered in said three-by-three pixel window.

17. A transform artifact reduction method for decoded video pixel data as in claim 15 wherein said plurality of spatial gradients comprise two spatial gradients.

18. A transform artifact reduction method for decoded video pixel data as in claim 15 wherein said plurality of spatial gradients comprise four spatial gradients.

19. A transform artifact reduction method for decoded video pixel data as in claim 15 wherein said generating said pixel gradient further comprises:

combining said plurality of spatial gradients to obtain said pixel gradient.

20. A transform artifact reduction method for decoded video pixel data as in claim 3 further comprising prior to said comparing said pixel gradient with said adaptive edge threshold:

generating said adaptive edge threshold.

21. A transform artifact reduction method for decoded video pixel data as in claim 20 wherein said generating said adaptive edge threshold further comprises:

generating an edge estimator for a plurality of edges through said pixel to obtain a plurality of edge estimators wherein pixels in a window about said pixel are used to generate said plurality of edge estimators.

22. A transform artifact reduction method for decoded video pixel data as in claim 21 wherein said window is a three-by-three pixel window with said pixel centered in said three-by-three pixel window.

23. A transform artifact reduction method for decoded video pixel data as in claim 21 wherein said plurality of edge estimators comprise two pixel texture estimators.

24. A transform artifact reduction method for decoded video pixel data as in claim 21 wherein said plurality of edge estimators comprise four pixel texture estimators.

25. A transform artifact reduction method for decoded video pixel data as in claim 21 wherein said generating said adaptive edge threshold further comprises:

combining said plurality of edge estimators to obtain said adaptive edge threshold.

26. A transform artifact reduction method for decoded video pixel data as in claim 2 wherein said plurality of edge classifications includes an edge classification, and said pixel is assigned the edge classification if said edge flag for said pixel in said edge map indicates that said pixel is an edge pixel.

27. A transform artifact reduction method for decoded video pixel data as in claim 26 wherein a pixel assigned the edge classification is unchanged by said filtering of said pixel.

28. A transform artifact reduction method for decoded video pixel data as in claim 2 wherein said plurality of edge classifications includes an edge border classification.

29. A transform artifact reduction method for decoded video pixel data as in claim 28 wherein said pixel is assigned said edge border classification if (i) the edge flag for at least three pixels in a window of pixels about said pixel are not set; and (ii) said pixel is in a line of pixels in said window and the edge flag for each pixel in the line is not set.

30. A transform artifact reduction method for decoded video pixel data as in claim 29 wherein said window is a three-by-three pixel window with said pixel centered in said three-by-three pixel window.

31. A transform artifact reduction method for decoded video pixel data as in claim 29 wherein a pixel assigned said edge border classification is filtered in a one-dimensional filter that processes said line of pixels.

32. A transform artifact reduction method for decoded video pixel data as in claim 31 where said one-dimensional filter is a low pass filter.

33. A transform artifact reduction method for decoded video pixel data as in claim 2 wherein said plurality of edge classifications includes a shade classification.

34. A transform artifact reduction method for decoded video pixel data as in claim 33 wherein said pixel is assigned said shade classification if the edge flag for said pixel and each pixel in a window of pixels about said pixel is not set.

35. A transform artifact reduction method for decoded video pixel data as in claim 34 wherein said window is a three-by-three pixel window with said pixel centered in said three-by-three pixel window.

36. A transform artifact reduction method for decoded video pixel data as in claim 34 wherein a pixel assigned said shade classification is filtered in a two-dimensional filter that processes said window of pixels.

37. A transform artifact reduction method for decoded video pixel data as in claim 36 where said two-dimensional filter is a low pass filter.

38. A transform artifact reduction method for decoded video pixel data, said method comprising:
digitally noise reducing a block of pixels to obtain a digitally noise reduced block of pixels;
setting a replenished block flag to a predetermined state upon determining that said digitally noise reduced block of pixels is a replenished block;
identifying each pixel in said digitally noise reduced block of pixels as one of an edge pixel and not edge pixel;
classifying each pixel that is identified as said not edge pixel as one of a texture pixel and not texture pixel;
setting an edge block flag to a predetermined state upon said digitally noise reduced block of pixels having a predetermined number of pixels classified as edge pixels;
setting a texture block flag to a predetermined state upon said digitally noise reduced block of pixels having a predetermined number of pixels classified as texture pixels; and
filtering said digitally noise reduced block of pixels using a spatially-variant filter when any one of said block texture flag, said block edge flag, and said block replenish flag is set to said predetermined state.

39. A transform artifact reduction method for decoded video pixel data as in claim 38 wherein said identifying each pixel in said digitally noise reduced block of pixels as one of said edge pixel and said not edge pixel further comprises:

comparing a pixel gradient for a pixel with a threshold; and
identifying said pixel as said edge pixel upon said pixel gradient being greater than said threshold.

40. A transform artifact reduction method for decoded video pixel data as in claim 39 wherein said comparing said pixel gradient for said pixel further comprises:
comparing said pixel gradient with an adaptive edge threshold.

41. A transform artifact reduction method for decoded video pixel data as in claim 40 wherein said adaptive edge threshold is an adaptive texture threshold.

42. A transform artifact reduction method for decoded video pixel data as in claim 39 wherein said comparing said pixel gradient for said pixel further comprises:
comparing said pixel gradient with a luminance threshold.

43. A transform artifact reduction method for decoded video pixel data as in claim 39 wherein said comparing said pixel gradient for said pixel further comprises:
comparing said pixel gradient with both an adaptive edge threshold, and a luminance threshold.

44. A transform artifact reduction method for decoded video pixel data as in claim 43 wherein said identifying said pixel as said edge pixel upon said pixel gradient being greater than said threshold further comprises:
identifying said pixel as an edge pixel only upon said pixel gradient being greater than said adaptive edge threshold, and being greater than said luminance threshold.

45. A transform artifact reduction method for decoded video pixel data as in claim 43 further comprising prior to said comparing said pixel gradient:
generating said luminance threshold.

46. A transform artifact reduction method for decoded video pixel data as in claim 45 wherein said generating said luminance threshold further comprises:
generating a background luminance measure for said pixel wherein said luminance threshold is proportional to said background luminance measure.

47. A transform artifact reduction method for decoded video pixel data as in claim 46 wherein said generating said background luminance measure for said pixel further comprises:
averaging luminance components in a window about said pixel.

48. A transform artifact reduction method for decoded video pixel data as in claim 47 wherein said window is a three-by-three pixel window with said pixel centered in said three-by-three pixel window.

49. A transform artifact reduction method for decoded video pixel data as in claim 46 wherein said generating said luminance threshold further comprises:
adjusting said background luminance measure to obtain an adjusted background luminance measure.

50. A transform artifact reduction method for decoded video pixel data as in claim 49 wherein said generating said luminance threshold further comprises:
defining said luminance threshold as the maximum of a minimum luminance threshold and said adjusted background luminance measure.

51. transform artifact reduction method for decoded video pixel data as in claim 40 further comprising prior to said comparing said pixel gradient with said adaptive edge threshold:
generating said pixel gradient for said pixel.

52. A transform artifact reduction method for decoded video pixel data as in claim 51 wherein said generating said pixel gradient further comprises:

generating a plurality of spatial gradients for said pixel using pixels in a window about said pixel.

53. A transform artifact reduction method for decoded video pixel data as in claim 52 wherein said window is a three-by three pixel window with said pixel centered in said three-by-three pixel window.

54. A transform artifact reduction method for decoded video pixel data as in claim 52 wherein said plurality of spatial gradients comprise two spatial gradients.

55. A transform artifact reduction method for decoded video pixel data as in claim 52 wherein said plurality of spatial gradients comprise four spatial gradients.

56. A transform artifact reduction method for decoded video pixel data as in claim 52 wherein said generating said pixel gradient further comprises:

combining said plurality of spatial gradients to obtain said pixel gradient.

57. A transform artifact reduction method for decoded video pixel data as in claim 40 further comprising prior to said comparing said pixel gradient with said adaptive edge threshold:

generating said adaptive edge threshold.

58. A transform artifact reduction method for decoded video pixel data as in claim 57 wherein said generating said adaptive edge threshold further comprises:

generating an edge estimator for a plurality of edges through said pixel to obtain a plurality of edge estimators wherein pixels in a window about said pixel are used to generate said plurality of edge estimators.

59. A transform artifact reduction method for decoded video pixel data as in claim 58 wherein said window is a three-by-three pixel window with said pixel centered in said three-by-three pixel window.

60. A transform artifact reduction method for decoded video pixel data as in claim 58 wherein said plurality of edge estimators comprise two pixel texture estimators.

61. A transform artifact reduction method for decoded video pixel data as in claim 58 wherein said plurality of edge estimators comprise four pixel texture estimators.

62. A transform artifact reduction method for decoded video pixel data as in claim 58 wherein generating said adaptive edge threshold further comprises:

combining said plurality of edge estimators to obtain said adaptive edge threshold.

63. A transform artifact reduction method for decoded video pixel data as in claim 38 wherein said classifying each pixel that is identified as said not edge pixel as one of said texture pixel and said not texture pixel further comprises:

combining a plurality of edge estimators to obtain a texture estimator.

64. A transform artifact reduction method for decoded video pixel data as in claim 63 wherein said plurality of edge estimators were generated in said identifying each pixel as one of said edge pixel and said not edge pixel.

65. A transform artifact reduction method for decoded video pixel data as in claim 63 wherein said classifying each pixel that is identified as said not edge pixel as one of said texture pixel and said not texture pixel further comprises:

comparing said texture estimator to a texture pixel threshold wherein upon said texture estimator being greater than said texture pixel threshold, said pixel is classified as a texture pixel.

66. A transform artifact reduction method for decoded video pixel data as in claim 38 wherein said filtering of said digitally noise reduced block of pixels further comprises:

classifying each pixel as one of an edge pixel, an edge boundary pixel and a shade pixel.

67. A transform artifact reduction method for decoded video pixel data as in claim 66 wherein in said filtering of said digitally noise reduced block of pixels, a pixel is classified as said edge pixel if said pixel was identified as said edge pixel.

68. A transform artifact reduction method for decoded video pixel data as in claim 66 wherein said pixel classified as said edge pixel is unchanged by said filtering.

69. A transform artifact reduction method for decoded video pixel data as in claim 67 wherein said pixel is classified as said edge border pixel if (i) at least three pixels in a window of pixels about said pixel are identified as said not edge pixel; and (ii) said pixel is in a line of pixels in said window and each pixel in the line is identified as said not edge pixel.

70. A transform artifact reduction method for decoded video pixel data as in claim 69 wherein said window is a three-by-three pixel window with said pixel centered in said three-by-three pixel window.

71. A transform artifact reduction method for decoded video pixel data as in claim 66 wherein in said filtering of said digitally noise reduced block of pixels, a pixel classified as an edge border pixel is filtered in a one-dimensional filter that processes said line of pixels.

72. A transform artifact reduction method for decoded video pixel data as in claim 71 where said one-dimensional filter is a low pass filter.

73. A transform artifact reduction method for decoded video pixel data as in claim 66 wherein said pixel is classified as said shade pixel if each pixel in a window of pixels about said pixel and said pixel are identified as said not edge pixels.

74. A transform artifact reduction method for decoded video pixel data as in claim 73 wherein said window is a three-by-three pixel window with said pixel centered in said three-by-three pixel window.

75. A transform artifact reduction method for decoded video pixel data as in claim 66 wherein said pixel classified as said shade pixel is filtered in a two-dimensional filter that processes said window of pixels.

76. A transform artifact reduction method for decoded video pixel data as in claim 75 where said two-dimensional filter is a low pass filter.

77. An edge detection method for transform artifact reduction comprising:

comparing a pixel gradient for a pixel with a luminance threshold;

setting an edge flag for said pixel in an edge map upon said pixel gradient being greater than said threshold;

repeating said comparing and setting processes for each pixel in a block of pixels.

78. An edge detection method for transform artifact reduction as in claim 77 further comprising:

comparing said pixel gradient with an adaptive edge threshold.

79. An edge detection method for transform artifact reduction as in claim 78 wherein said adaptive edge threshold is an adaptive texture threshold.

80. An edge detection method for transform artifact reduction as in claim 78 wherein said setting said edge flag for said pixel in said edge map upon said pixel gradient being greater than said threshold further comprises:

setting said edge flag only upon said pixel gradient being greater than said adaptive edge threshold, and being greater than said luminance threshold.

81. An edge detection method for transform artifact reduction as in claim 77 further comprising prior to said comparing said pixel gradient for said pixel with said luminance threshold:
generating said luminance threshold.

82. An edge detection method for transform artifact reduction as in claim 81 wherein said generating said luminance threshold further comprises:
generating a background luminance measure for said pixel wherein said luminance threshold is proportional to said background luminance measure.

83. An edge detection method for transform artifact reduction as in claim 82 wherein said generating [a] said background luminance measure for said pixel further comprises:
averaging luminance components in a window about said pixel.

84. An edge detection method for transform artifact reduction as in claim 83 wherein said window is a three-by-three pixel window with said pixel centered in said three-by-three pixel window.

85. An edge detection method for transform artifact reduction as in claim 82 wherein said generating said luminance threshold further comprises:
adjusting said background luminance measure to obtain an adjusted background luminance measure.

86. An edge detection method for transform artifact reduction as in claim 85 wherein said generating said luminance threshold further comprises:
defining said luminance threshold as the maximum of a minimum luminance threshold and said adjusted background luminance measure.

87. An edge detection method for transform artifact reduction as in claim 78 further comprising prior to said comparing said pixel gradient with said adaptive edge threshold:
generating said pixel gradient for said pixel.

88. An edge detection method for transform artifact reduction as in claim 87 wherein said generating said pixel gradient further comprises:
generating a plurality of spatial gradients for said pixel using pixels in a window about said pixel.

89. An edge detection method for transform artifact reduction as in claim 88 wherein said window is a three-by-three pixel window with said pixel centered in said three-by-three pixel window.

90. An edge detection method for transform artifact reduction as in claim 88 wherein said plurality of spatial gradients comprise two spatial gradients.

91. An edge detection method for transform artifact reduction as in claim 88 wherein said plurality of spatial gradients comprise four spatial gradients.

92. An edge detection method for transform artifact reduction as in claim 88 wherein said generating pixel gradient further comprises:
combining said plurality of spatial gradients to obtain said pixel gradient.

93. An edge detection method for transform artifact reduction as in claim 78 further comprising said pixel gradient with said adaptive edge threshold:
generating said adaptive edge threshold.

94. An edge detection method for transform artifact as in claim 93 wherein said generating said adaptive edge threshold further comprises:
generating an edge estimators for a plurality of edges through said pixel to obtain a plurality of edge estimators wherein pixels in a window about said pixel are used to generate said plurality of edge estimators.

95. An edge detection method for transform artifact reduction as in claim 94 wherein said window is a three-by-three pixel window with said pixel centered in said three-by-three pixel window.

96. An edge detection method for transform artifact reduction as in claim 94 wherein said plurality of edge estimators comprise two pixel texture estimators.

97. An edge detection method for transform artifact reduction as in claim 94 wherein said plurality of edge estimators comprise four pixel texture estimators.

98. An edge detection method for transformation artifact reduction as in claim 94 wherein said generating said adaptive edge threshold further comprises:
combining said plurality of edge estimators to obtain said adaptive edge threshold.

99. A spatially-variant filtering method to reduce transform artifacts comprising:
assigning a pixel in a block of pixels one classification in a plurality of edge classifications using edge flags in an edge map for pixels in a window about said pixel wherein an edge flag for a pixel is set in said edge map to indicate said pixel is in an edge of a video image; and
filtering each pixel in said block of pixels based upon said assigned classification to reduce transform artifacts in said video image.

100. A spatially-variant filtering method to reduce transform artifacts as in claim 99 wherein said plurality of edge classifications includes an edge classification, and said pixel is assigned the edge classification if said edge flag for said pixel in said edge map indicates that said pixel is an edge pixel.

101. A spatially-variant filtering method to reduce transform artifacts as in claim 100 wherein a pixel assigned said edge classification is unchanged by said filtering of said pixel.

102. A spatially-variant filtering method to reduce transform artifacts as in claim 99 wherein said plurality of edge classifications includes an edge border classification.

103. A spatially-variant filtering method to reduce transform artifacts as in claim 102 wherein said pixel is assigned said edge border classification if (i) the edge flag for at least three pixels in a window of pixels about said pixel are not set; and (ii) said pixel is in a line of pixels in said window and the edge flag for each pixel in the line is not set.

104. A spatially-variant filtering method to reduce transform artifacts as in claim 103 wherein said window is a three-by-three pixel window with said pixel centered in said three-by-three pixel window.

105. A spatially-variant filtering method to reduce transform artifacts as in claim 103 wherein a pixel assigned said edge border classification is filtered in a one-dimensional filter that processes said line of pixels.

106. A spatially-variant filtering method to reduce transform artifacts as in claim 105 where said one-dimensional filter is a low pass filter.

107. A spatially-variant filtering method to reduce transform artifacts as in claim 99 wherein said plurality of edge classifications includes a shade classification.

108. A spatially-variant filtering method to reduce transform artifacts as in claim 107 wherein said pixel is assigned said shade classification if the edge flag for said pixel and each pixel in a window of pixels about said pixel is not set.

109. A spatially-variant filtering method to reduce transform artifacts as in claim 108 wherein said window is a three-by-three pixel window with said pixel centered in said three-by-three pixel window.

110. A spatially-variant filtering method to reduce transform artifacts as in claim 108 wherein a pixel assigned said shade classification is filtered in a two-dimensional filter that processes said window of pixels.

111. A spatially-variant filtering method to reduce transform artifacts as in claim 110 where said two-dimensional filter is a low pass filter.

* * * * *